United States Patent [19]
Lemelson et al.

[11] Patent Number: 6,032,861
[45] Date of Patent: Mar. 7, 2000

[54] METHOD AND APPARATUS FOR ENCODING AND DECODING BAR CODES WITH PRIMARY AND SECONDARY INFORMATION AND METHOD OF USING SUCH BAR CODES

[76] Inventors: Jerome H. Lemelson, Suite. 286, Unit 802 930 Tahoe Blvd., Incline Village, Nev. 89451; John H. Hiett, 1060 W. Boulder La., Flagstaff, Ariz. 86001

[21] Appl. No.: 08/719,008

[22] Filed: Sep. 24, 1996

Related U.S. Application Data

[63] Continuation-in-part of application No. 08/367,698, Jan. 3, 1995, Pat. No. 5,563,401.

[51] Int. Cl.$^7$ .................................................... G06K 7/10
[52] U.S. Cl. ............................................ 235/456; 235/494
[58] Field of Search ............................... 235/495, 456, 235/460, 462.04, 462.32, 494

[56] References Cited

U.S. PATENT DOCUMENTS

| | | | |
|---|---|---|---|
| 3,902,049 | 8/1975 | Hanchett, Jr. | 235/61.11 E |
| 3,980,823 | 9/1976 | Howard | 178/30 |
| 4,074,114 | 2/1978 | Dobras | 235/463 |
| 4,578,570 | 3/1986 | Mazumder et al. | 235/463 |
| 4,614,362 | 9/1986 | Breen et al. | 282/9 R |
| 4,731,526 | 3/1988 | Knoll et al. | 235/494 |
| 4,889,367 | 12/1989 | Miller | 283/88 |
| 4,988,852 | 1/1991 | Krishnan | 235/462 |
| 5,000,529 | 3/1991 | Katoh et al. | 350/6.7 |
| 5,078,518 | 1/1992 | Ono et al. | 400/103 |
| 5,128,528 | 7/1992 | Heninger | 235/470 |
| 5,153,418 | 10/1992 | Batterman et al. | 235/494 |
| 5,170,044 | 12/1992 | Pastor | 235/454 |
| 5,189,292 | 2/1993 | Batterman et al. | 235/494 |
| 5,235,167 | 8/1993 | Dvorkis et al. | 235/462.21 |

(List continued on next page.)

OTHER PUBLICATIONS

Burke, H. *Barcodes Galore: Maximize Productivity*, Tevaki Associates, pp. 66–75. 1992.

Harmon, C. *Lines of Communication: Bar Code and Data Collection Technology For the 90's*, Helmers Publishing, Inc., pp. 83–104, 1994.

Palmer, R. *Reading, Printing, and Specification of Bar Code Symbols*, Helmers Publishing Inc., pp. 61–67, 1991.

Sobczak, T. *Applying Industrial Bar Coding.*, Society of Manufacturing Engineers, pp. 39–66, 1985.

Benjamin Nelson *Punched codes to Bar Codes*, Helmers Publishing Company, 1997, pp. 236.

*Primary Examiner*—Donald Hajec
*Assistant Examiner*—Mark Tremblay
*Attorney, Agent, or Firm*—Steven G. Lisa

[57] ABSTRACT

A bar code (10) has primary information (46, 48, 50, 51) encoded in one direction (e.g., horizontally) and secondary information (13,21,36) encoded in another direction (e.g., vertically) in single (11) or multiple tracks (35) in selected ones of the vertical bars (11) of a bar code (10). Using a non-linear, variable amplitude scanner, all of the primary bars are scanned in the one direction to obtain all of the primary information and all of those vertical bars having secondary information are scanned in the other direction to obtain all of the secondary information. The one direction which is perpendicular to the vertical primary bars (11), is determined by first rotating the scan path axis (86,87) until both start (46) and end (48) code bars are read thereby placing the scan path entirely within the total bar code, and, then, further rotating the scan path (88,89) to determine the direction of the minimum crossing width (Lsc 80) of the total bar code (10). Secondary information is scanned in planes orthogonal to the one direction after those vertical bars (11) having such information are first identified and selected. In a preferred embodiment, the decoded secondary information may be used to control selected station process operations for selected products in a continuous manufacturing assembly line.

33 Claims, 13 Drawing Sheets

U.S. PATENT DOCUMENTS

| | | | |
|---|---|---|---|
| 5,276,315 | 1/1994 | Surka | 235/462 |
| 5,288,986 | 2/1994 | Pine et al. | 235/494 |
| 5,296,690 | 3/1994 | Chandler et al. | 235/462 |
| 5,296,693 | 3/1994 | Hughes-Hartogs | 235/494 |
| 5,298,731 | 3/1994 | Ett | 235/494 |
| 5,304,787 | 4/1994 | Wang | 235/462 |
| 5,355,001 | 10/1994 | Fujimoto et al. | 235/494 |
| 5,357,094 | 10/1994 | Baldwin | 235/494 |
| 5,367,578 | 11/1994 | Golem et al. | 382/12 |
| 5,412,198 | 5/1995 | Dvorkis | 235/472 |
| 5,414,250 | 5/1995 | Swartz et al. | 235/462.1 |
| 5,416,311 | 5/1995 | Kyriazis | 235/494 |
| 5,428,211 | 6/1995 | Zheng et al. | 235/462 |
| 5,436,437 | 7/1995 | Ho | 235/384 |
| 5,442,164 | 8/1995 | Adachi | 235/463 |
| 5,454,054 | 9/1995 | Iizuka | 235/456 |
| 5,468,945 | 11/1995 | Huggett et al. | 235/462 |
| 5,481,100 | 1/1996 | Terauchi | 235/462 |
| 5,486,689 | 1/1996 | Ackley | 235/463 |
| 5,489,769 | 2/1996 | Kubo | 235/462 |
| 5,513,264 | 4/1996 | Wang et al. | 380/51 |
| 5,514,858 | 5/1996 | Ackley | 235/462 |

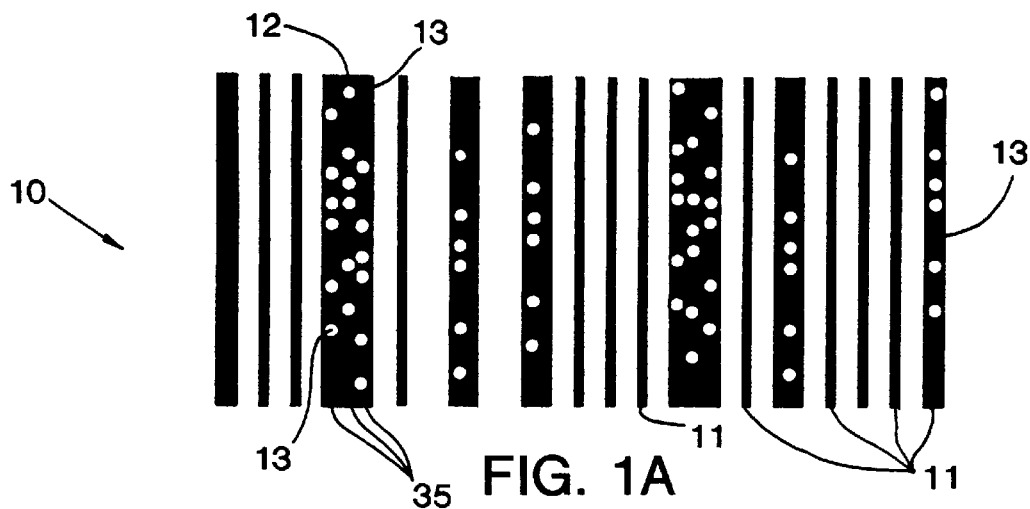
FIG. 1A
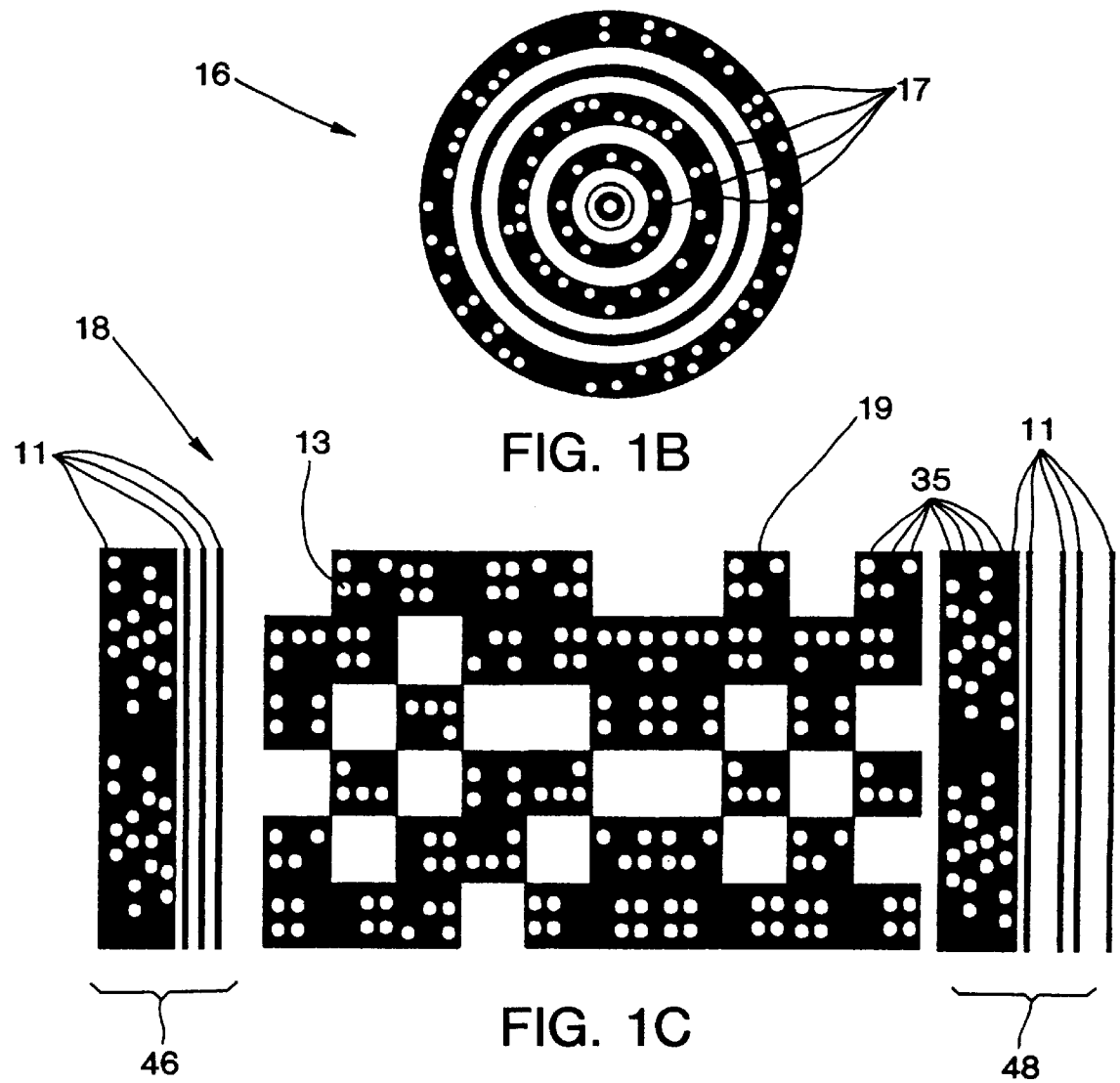
FIG. 1B
FIG. 1C

METHOD AND APPARATUS FOR ENCODING AND DECODING BAR CODES WITH PRIMARY AND SECONDARY INFORMATION AND METHOD OF USING SUCH BAR CODES

This is a Continuation-In-Part application of Jerome H. Lemelson sole U.S. patent application Ser. No. 08/367,698 filed Jan. 3, 1995, now U.S. Pat. No. 5,563,401.

FIELD OF THE INVENTION

This invention relates to bar code systems and methods and their method of use, and, more particularly, to placing primary and secondary information into a bar code, removing such information from a bar code and using the extracted information to control a manufacturing process.

BACKGROUND OF THE INVENTION

Prior Primary Information Bar Codes

Bar codes and similar code recording arrangements are widely used today to mark objects in order to provide rapidly readable codes containing information relating to the object, such as, its identity or its price. For example, see The Bar Code Book: Reading, Printing, and Specification of Bar Code Symbols, by R. Palmer (Helmers Publishing, Inc., 1991); Lines of Communication: Bar Code and Data Collection Technology For the 90's, by C. Harmon (Helmers Publishing, Inc., 1994); Applying Industrial Bar Coding, by T. Sobczak (Society of Manufacturing Engineers, 1985); or Barcodes Galore: Maximize Productivity, by H. Burke (Tevaki Associates, 1992). Such codes usually consist of a horizontal series of printed vertical parallel bars of varying widths and spacings arranged to produce a particular reflectivity pattern when the bars are scanned sequentially in a straight line with a light beam such as, a laser beam, in a direction transverse to the orientation of the bars.

Most continuous manufacturing processes perform different operations at different stations in the assembly line. For example, in an engine block assembly line, a hole is drilled at one station, tapped at another and studded at yet another. Normally, a bar code may be used to store primary information relating to the product's identification, inventory, and pricing, etc. While it is known to provide such process information in a bar code, nonetheless, it is not known to provide such product-specific, process-specific tasks as a type of secondary information stored in a single bar code along with the aforesaid general primary information. Accordingly, there is a need for and it is an object of the present invention to provide a method for using the bar code having primary general product information and secondary process-specific information in a single bar code and a method for using such bar codes to control a manufacturing process involving object dependent tasks that rely on the secondary, process-specific information embedded within the primary bars.

Prior High Density Bar Codes

Heretofore, recording both primary product-specific and process-specific information in bar codes has required the use of multiple bar codes (i.e. one bar code defining the primary information and one or more additional, separate bar codes defining the secondary information). Conventional bar codes have severe spatial imitations and are able to store only a limited amount of information. A problem with using multiple bar codes on a part or product, however, has been that they occupy substantial space and reading is complicated. The prior art discloses many methods for increasing storage density. For examples of such systems, see the following U.S. Pat. Nos. 4,889,367; 5,128,528; 5,153,418; 5,170,044; 5,296,693; 5,189,292; 5,355,001; and 5,481,100.

However, none of the known prior art is designed to be downward compatible with the conventional bar code technology (i.e. UPC symbology.) while at the same time increasing the storage density. Therefore, there is a need for and it is an object of the present invention to provide an improved method for more efficiently encoding and decoding both primary and secondary information in a single bar code in a manner which not only increases its storage density, but also is downwardly compatible with conventional bar code reading/scanning technology.

Prior Bar Code Checking Techniques

Some methods of using parity checking and other error correcting schemes in bar codes are disclosed in the prior art. For example, see the following U.S. Pat. Nos. 5,288,986 and 5,436,437. However, these methods are complex and cumbersome to use. Accordingly, there is a need for and it is an object of the present invention to provide a method to simply checking, tracking, and labeling procedures.

Prior Bar Code Linear Scanning Techniques

The prior art teaches that bar codes are scanned and read by decoding and reading the entire bar code. For examples of such decoding technology using linear scanning methods, see U.S. Pat. Nos. 3,902,049; 4,074,114; 4,578,570; 5,357,094; 5,412,198; 5,486,689; and 5,514,858. For examples of decoding technology using image processing or image analysis, see U.S. Pat. Nos. 4,578,570, 4,988,852; 5,276,315; 5,296,690; 5,304,787; 5,367,578; 5,428,211; 5,468,945; and 5,489,769. However, there is a need for and it is an object of the present invention to provide a method of selectively reading only a part or fraction of a bar code for certain selected information to provide a relatively simple and more cost-effective way of reading a bar code having both primary and secondary/auxiliary information.

It is a further specific object of the invention to provide a method for reading a bar code in one direction to scan in primary information and in another direction to scan in secondary information.

SUMMARY OF THE INVENTION

One aspect of the invention is a method of reading a bar code having an area with primary and secondary information encoded therein which includes the steps of scanning the area in one direction to decode the primary information, and scanning the area in another direction to decode the secondary information.

One feature of this aspect of the invention is use of a plurality of spaced apart primary bars in the scanned area. In this form of the invention the step of scanning the primary bars in the one direction includes locating a direction perpendicular to the primary bars, scanning the primary bars in the perpendicular direction, and interpreting the decoded primary information obtained. In this aspect of the invention step of scanning the bars in the other direction to decode the secondary information includes determining a direction perpendicular to the bars, identifying each bar with secondary information encoded therein, and scanning selected ones of the bars in the other direction orthogonal to the one direction.

Another feature of this aspect of the invention includes locating a direction perpendicular to the primary bars by scanning the primary bars with a scan beam in a scan path in a plane of the bars while the path is rotated about one axis until the path crosses a start or stop code of the bar code thereby identifying a crossing length of the bar code, shifting the axis of rotation to a point within the bar code substantially at the center of the crossing length of the bar code, and continuing to rotate the scan path until both a start and stop code of the bar code are crossed in a minimum crossing length.

A still further feature of this aspect of the invention includes the step of scanning the bars in the other direction by positioning a scan beam path parallel to the other direction of encoded secondary information, moving the scan beam in the other direction to one end of the area, rotating the scan beam to a direction opposite the other direction, scanning the area of encoded secondary information in the opposite direction along an entire length of a bar, and interpreting the secondary information obtained.

A second aspect of the invention is a system for reading a bar code having areas with primary and secondary information encoded therein which includes a computer system for controlling the reading of the bar code, a horizontal driver and a vertical driver coupled to the computer system, a horizontal actuator coupled to the horizontal driver and the computer system for controlling horizontal directional scanning of the bar code, a vertical actuator coupled to the vertical driver and the computer system for controlling vertical directional scanning of the bar code, a laser for producing a scanning beam, optics coupled to the horizontal actuator and the vertical actuator for controlling the beam of the laser onto the bar code in a predetermined scanning pattern to receive reflected light from the bar code representative of the primary information encoded therein in one direction and the secondary information encoded therein in another direction, a photodetector coupled to the optics for producing an analog voltage output corresponding to the intensity of the measured reflected light received by the photodetector via the optics, and an analog to digital converter coupled to the photodetector and the computer system for converting the analog voltage output to a digital signal which is coupled to the computer system for interpretation.

A third aspect of the invention includes a method of using a bar code having areas with primary information and secondary information encoded therein to control work to be performed on a workpiece which includes the steps of applying the bar code to the workpiece, scanning the bar code and decoding the primary information in the bar code to identify the workpiece, determining the areas of the bar code with secondary information describing the work to be performed on the workpiece, scanning selected ones of those areas of the bar code having the desired secondary information, commanding selected ones of a plurality of work stations to perform work on the workpiece according to the decoded secondary information, and performing the commanded work on the workpiece at the assigned stations.

Other objects, features, and advantages of the invention will become evident in light of the following detailed description considered in conjunction with the referenced drawings of a preferred exemplary embodiment according to the present invention.

DESCRIPTION OF THE DRAWINGS

FIG. 1A is a schematic view of a generally rectangular bar code of the present invention in which the bar elements include an electro-optically readable code of reflective circular areas embedded longitudinally in selected ones of the vertical bars.

FIG. 1B is a schematic view of a generally circular bar code of the present invention in which the concentric black circles or rings include an electro-optically readable code of reflective circular areas embedded within and along selected ones of the black circles or rings.

FIG. 1C is a schematic view of a two-dimensional (2-D) bar code of the present invention in which the black patterned rectangular areas include an electro-optically readable code of reflective circular areas embedded within selected ones of the black rectangular areas.

DETAILED DESCRIPTION OF THE INVENTION

Figure 2:
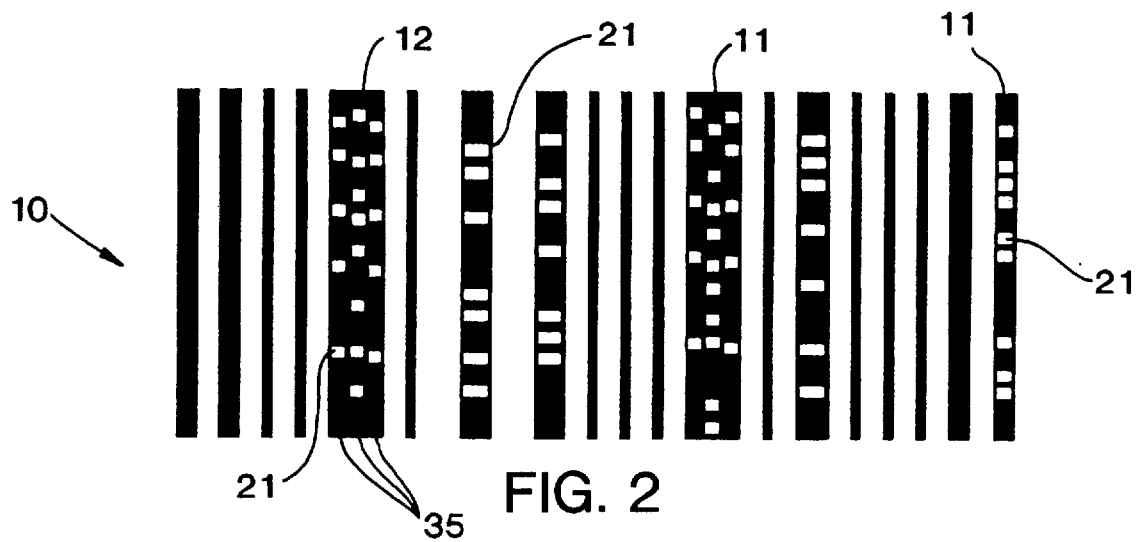
FIG. 2 is a schematic view of a bar code of the present invention in which selected ones of the vertical bar elements are divided into discrete segments by embedded rectangular voids defining an additional optical code.

The present invention of this application is better understood in conjunction with the following Figures and detailed Specification of the preferred embodiment. The various hardware and software elements used to carry out the invention is illustrated in the attached drawings in the form of schematic and block diagrams and flow charts. For simplicity and brevity, the Figures, and Specification do not address in detail features that are well known in the prior art, such as the literature listed in the Background of the Invention above and certain additional prior art which is discussed in the Detailed Description which follows. However, to assure an adequate disclosure, the specification hereby incorporates by reference each and every patent and other publication referenced above in the Background of the Invention or mentioned in the Detailed Description below.

A. The Parent Application

1. Primary and Secondary Information In A Single Bar Code

In parent application, Ser. No. 08/367,698 to Jerome H. Lemelson filed on Jan. 3, 1995, an object coding arrangement employing conventional bar codes or similar markings having primary information encoded in the conventional manner and having secondary/auxiliary information also encoded along one or more of the discrete marks or bars and/or in the spacings therebetween is disclosed. The secondary or auxiliary code may be optically read by an electro-optical transducer (which may be the same or different from the transducer used to read conventional bar codes). The auxiliary code may also be magnetically recorded on a magnetic medium. There continues to be a need for these improvements over the prior art and it is an object of the present invention to provide still further improvements of these features.

2. Single Bar Code Interference When Reading Primary and Secondary Codes

In a preferred form of the invention disclosed by the parent application, a bar code is printed or otherwise formed on a product, workpiece, tool or label and secondary/ additional information is provided longitudinally along one or more of the bars thereof by voids in the printing effected during or after printing. For examples of bar code printing technology, see the following U.S. Pat. Nos. 3,980,823; 4,614,362; 5,078,518; 5,298,731; and 5,513,264 which are hereby incorporated by reference herein. A pulsed laser beam may be used to pit or remove selected portions of the material making up the bars to define one or more electro-optically readable codes which may be sequentially or simultaneously electro-optically scanned with or without electro-optically scanning the bar code itself. In another form of that invention, one or more of the bars of a bar code may be printed with ink of a different color to provide secondary/auxiliary information or may contain magnetic recording ink defining digital and/or analog recordings. The parent application also disclosed that reading may be effected by line scanning laterally across one or more bars, by raster scanning normal to the bars, and/or by such scanning parallel to or along the longitudinal axis of the bars with or without scanning to detect the code defined by the bar codes. Codes other than so-called bar codes may thus be scanned per se or may have coded portions thereof also scanned to provide secondary/auxiliary information in addition to the primary information defined by the bars and their spacings or other indicia. Some of the prior art teaches methods for using a beam to scan in multiple directions. For examples of such methods, see the following U.S. Pat. Nos. 5,442,164 and 5,000,529 which are hereby incorporated by reference herein. There continues to be a need for these improvements over the prior art and it is an object of the present invention to provide still further improvements of these features.

However, when primary and secondary information are both embedded within a single bar code, problems with these prior methods may arise with the reading or scanning of these bar codes. A basic problem associated with reading or scanning the bar code with both primary and secondary information embedded therein is that the voids or pits which contain the secondary information encoded the bar code may interfere with the scanning and reading (decoding) of the primary information. Therefore, there is a need for and it is an object of the present improvement to my earlier copending parent application to provide a method of reliably reading and minimizing reading errors of a bar code with secondary information embedded within the primary information and a method of filtering out such secondary information when reading such primary information.

B. Bar Codes With Primary and Secondary Information

In FIGS. 1A, 1B, and 1C, there are three different types of bar codes shown that can store primary and secondary information. FIG. 1A shows a generally rectangular bar code 10 with a plurality of vertically spaced apart primary bars 11 for storing the primary information and having circular voids 13 embedded in select bars 11 for storing the secondary information. FIG. 1B shows a generally circular bar code 16 with a series of concentric black circles or rings 17 for storing the secondary information. FIG. 1C shows a two-dimensional (2-D) bar code 18 with bars 11 that are identifier bars 46 (start code) and 48 (stop code) and a plurality of black patterned rectangular areas 19 for storing the primary information and having voids embedded in select rectangular areas 18 for storing the secondary information. However, any suitable bar code that can store primary and secondary information in any manner may be utilized for carrying out the purpose of the present invention which is not in any way limited to the ways shown in FIGS. 1A, 1B, or 1C.

Figure 3:
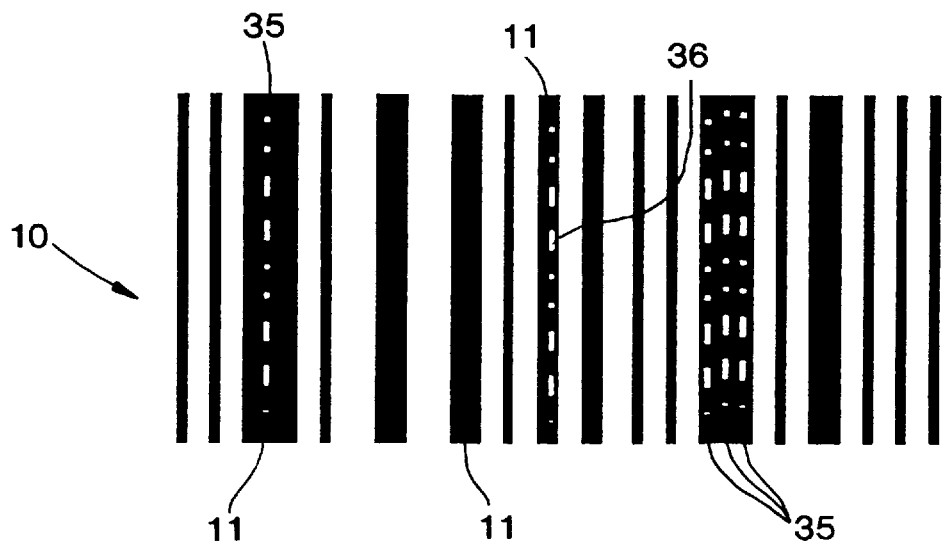
FIG. 3 is a schematic view of a bar code of the present invention printed with magnetic ink or otherwise formed of magnetic material having a plurality of magnetically recorded code tracks running longitudinally in selected ones of the vertical bars.

As best seen in FIGS. 1A, 2, and 3 there is shown a bar code 10 storing primary and secondary information in three different ways. However, any suitable method of storing primary and secondary information on a bar code may be utilized for carrying out the purpose of the present invention which is not in any way limited to the ways shown in FIGS. 1A–3. FIG. 1A shows a bar code 10 having voids 13 embedded within selected ones of the individual primary bars 11 for storing the secondary information. FIG. 2 shows a bar code 10 having discrete segments 21 to divide selected ones of the primary bars 11 in a manner for storing secondary information. FIG. 3 shows a bar code 10 with one or more longitudinal magnetic strips or tracks 35 within selected ones of the primary bars 11 for storing the secondary information.

As seen in FIG. 1A a first form of the invention is defined by a printed bar code 10 formed of a plurality of spaced apart printed black bars 11 arranged in a horizontal row, each black bar 11 having its longitudinal axis vertical and parallel to the longitudinal axis of each other black bar 11 in the row. The row of black bars 11 define a code which is electro-optically readable by, for example, a light beam, such as, a laser beam, television camera, light pen or other form of reader able to scan the bars 11 of bar code 10 of FIG. 1A sequentially or in some other order in a direction transverse to the vertical, longitudinal orientation of the bars 11 as seen in FIG. 1A. As would be well known to one of ordinary skill in the art, there are numerous types of conventional transverse readers for scanning bar codes, such as, the readers mentioned above, which operate to read bar codes. While several specific types of conventional transverse readers may be described in the specification, any and all types of transverse bar code readers may be adapted for use in the present invention to read the primary and secondary information encoded in the bar codes 10 of FIGS. 1A–3.

Some of the bars 11 of FIG. 1A are shown containing a series of circular areas 13 which are void of printed matter and which extend along one or more vertical tracks 35 of the bar 11 parallel to the vertical or longitudinal axis of the bar 11. Such circular voids 13, which may be of any shape and size, are provided in the form of one or more defining codes and may be of substantially smaller areas than illustrated to be read by an electro-optical reader, such as, a laser scanner or TV camera operable to scan vertically, longitudinally with respect to the bars 11 containing the voids 13. Thus, the vertical tracks 35 of circular areas 13 are preferably arranged to be scanned vertically, that is, in a direction generally perpendicular to the horizontal direction in which the series of bars 11 are arranged to be scanned. If the circular code defining areas or pits 13 are embedded within one or more parallel bars and/or two or more tracks 35 of a single bar 11 or an index bar 12 with multiple tracks 35, they may also be read by a light beam scanning normal, e.g., horizontally, relative to the vertical bars in one or more horizontal parallel scans of the bars. Each multiple track bar 11 or 12 may be scanned alone or simultaneously while the entire bar code 10 is also scanned and read. Thus, while several specific ways of scanning and several specific shapes and sizes of voids, pits, or spaces in the bars 11 of the bar code 10 are described in this specification, any and all ways of scanning and any and all types, shapes, and sizes of voids, pits, or spaces man be used, as long as the primary and secondary information is able to be stored within the bar code 10 and read by a scanning method. Specifically, the present invention is not limited to vertical bar codes which may be scanned horizontally and vertically relative thereto. For example, the present invention may be applied using tilted bar codes, circular bar codes, or matrix or grid bar codes.

The circular areas or pits 13 may be formed by superimposing printing material over a base printing material which defines the bar 11 itself, or by providing voids in the ink of the bars 11 which voids 13 are formed by printing or by ablating such areas 13 with a computer controlled pulsed laser beam However, the circular areas, pits, or spaces can be formed in any suitable manner and method, and the formation of these areas, pits, or spaces is not in any way limited to the methods described in this specification.

In FIG. 2, a bar code 10 is formed of a plurality of printed or otherwise formed bars 11, one or more of which contain rectangular voids 21 which define one or more codes by their spacings, lengths, or widths, etc. The rectangular voids 21 that form secondary information in a bar 11 may be scanned sequentially in a horizontal direction transverse to the vertical longitudinal axis of each bar. However, the preferred method for scanning the secondary information of bar 11 of FIG. 2 is sequentially in a vertical direction generally perpendicular to the direction in which the primary bars 11 are scanned. Here again, the individual bars may be electro-optically scanned by a beam scanning vertically parallel to their longitudinal axes. Alternatively, the secondary information may be scanned by a sensor array scanning one or more of the bars 11 vertically while relative scanning movement is being simultaneously effected horizontally or obliquely relative to the vertical bars. However, while several specific ways of scanning and specific shapes and sizes of voids, pits, or spaces in the bars 11 of the bar code 10 are described in this specification, any and all ways of scanning and any and all types, shapes, and sizes of voids, pits, or spaces are able to be used, as long as the primary and secondary information is stored within the bar code 10 and read by a scanning method.

In FIG. 3, a bar code 10 is provided printed with or otherwise formed of magnetic ink or other magnetic material. Magnetically recorded longitudinally along the vertical bars 11 are one or more tracks 35 of code recordings 36 to be read, as above, by a magnetic pick-up scanned vertically parallel to and along the bars. In another embodiment of the invention (not shown), a bar code 10 may be provided with a secondary/auxiliary code printed between two or more bars of the code of the same or different color ink. However, while several specific ways of scanning and specific shapes and sizes of voids, pits, magnetic markings, or spaces in the bars 11 of the bar code 10 are described in this specification, any and all ways of scanning and any and all types, shapes, and sizes of voids, pits, magnetic markings, or spaces are able to be used, as long as the primary and secondary information is able to be stored within the bar code and read by a scanning method.

Thus, while specific types of information (i.e. primary and secondary/auxiliary information) stored within the bar code are described in this specification, any and all types of information may be stored within the bar code to be scanned/read in a known manner.

C. Method of Reading/Scanning A Bar Code With Primary and Secondary Information The present invention also discloses an improved method for reading a bar code with primary and secondary information by modifying conventional transverse scanning methods as described earlier in this specification. The bar codes with primary and secondary information of the present invention may be used, for example, to initiate selected steps of a manufacturing process. The bar code of the present invention may be used in a wide variety of other applications and is not in any way limited to the specific applications described in this specification.

Figure 4A:
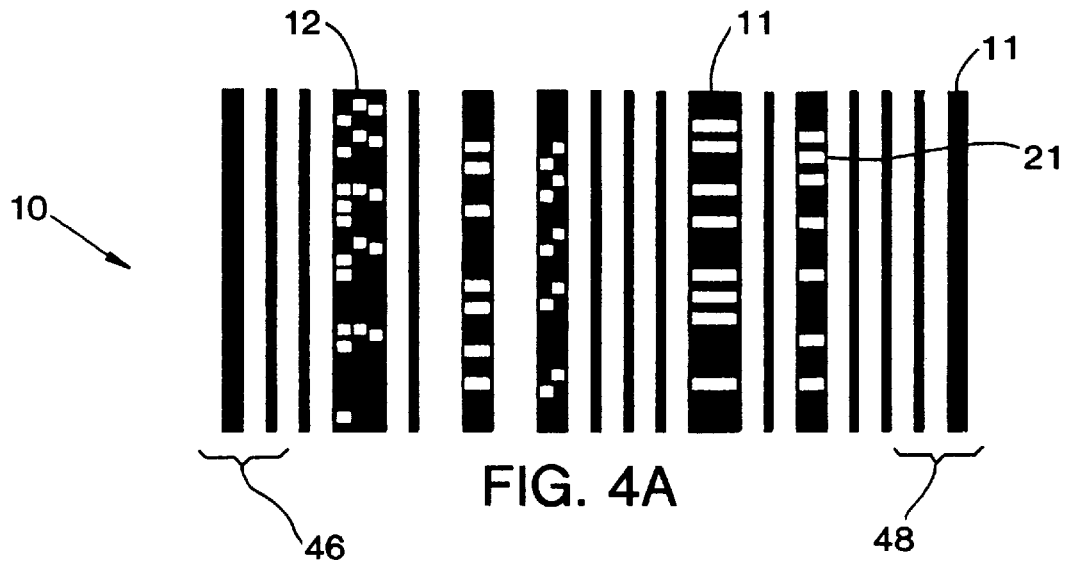
FIG. 4A is a schematic view of a bar code of the present invention with primary and secondary information having single leading and trailing bars that identify a category and standard encoded in the bar code.
Figure 4B:
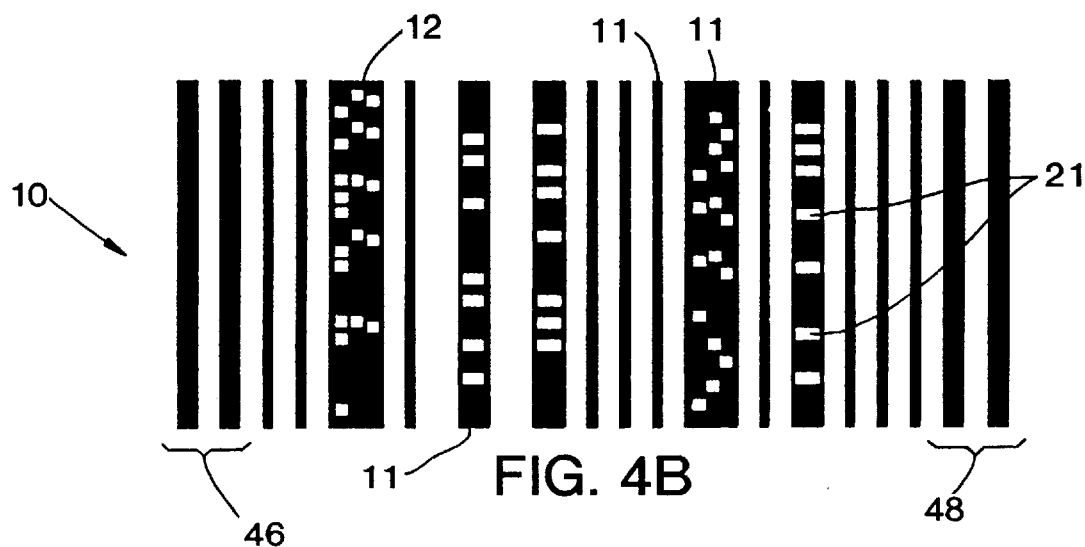
FIG. 4B is a schematic view of a bar code of the present invention with primary and secondary information having double leading and trailing bars that identify a category and standard encoded in the bar code.

Bar codes 10 include a plurality of spaced apart, vertical identifier bars 11 which comprise encoded identification, inventory, pricing, and other such information (i.e. Primary Information). The vertical identifier bars 11 are easily scanned or read and decoded to obtain the relevant information about the product contained in the bar code. FIG. 4A shows a bar code 10 with primary and secondary information having a leading identifier bar 46 (start code) and a trailing identifier bar 48 (stop code) along with a primary index bar 12 having secondary information identifying location and/or type of secondary data distributed within the entire bar code 10. FIG. 4B shows a bar code 10 with primary and secondary information having two leading identifier bars 46 (start code) and two trailing identifier bars 48 (stop code). The leading identifier bar(s) 46 and the trailing identifier bar(s) 48 are used to identify the encoded category (i.e. Federation of Automated Coding Technologies ("FACT") data identifier which include, but are not limited to automotive, food, manufacturing, health, industry, etc.) and/or standard (i.e. Automatic Identification Manufacturers, Inc. ("AIM") symbology identifiers which include, but are not limited to, Code 39, 2 of 5 interleave, etc.). As an example, a single leading/trailing identifier bar group 46 and 48 could represent food product names as shown in FIG. 4A while a double leading/trailing identifier bar group 46 and 48 could represent blood types of a patient.

Figure 4C:
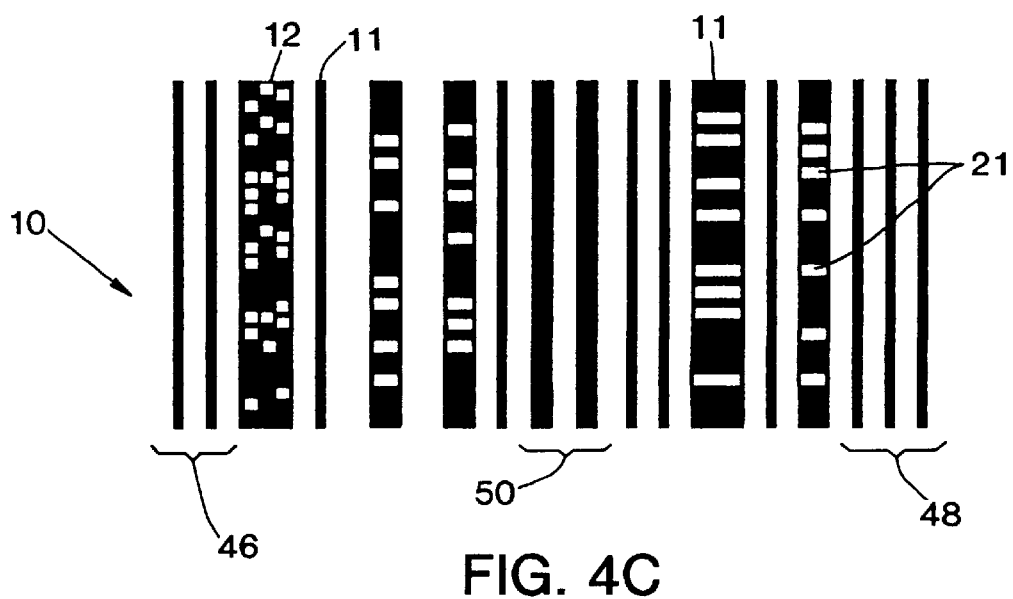
FIG. 4C is a schematic view of a bar code of the present invention with primary and secondary information having identifier bars encoding category and standard information in the middle of the primary bars.
Figure 4D:
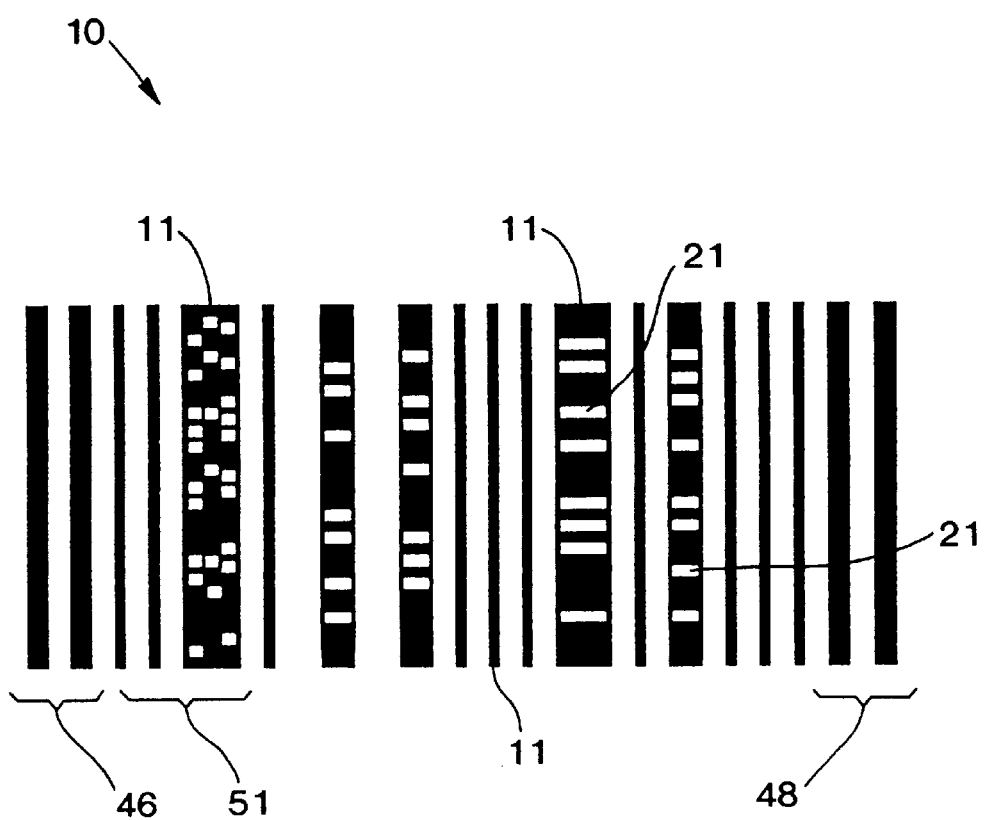
FIG. 4D is a schematic view of an entire bar code of the present invention with primary and secondary information having a leading identifier or start code bar group, a trailing identifier or stop code bar group, and another identifier code bar group located next to the leading identifier or start code bar group.

In another embodiment the identifier bar(s) 50 can be placed in a central area of the bar code 10 (i.e. if the bar code is bidirectional) as shown in FIG. 4C. In a still further alternative embodiment, the standard and/or category information/identification code 51 (i.e. first character identifier) is embedded in the data that is encoded in the bar code 10 itself as shown in FIG. 4D. There are numerous types of standard and/or category information/identification code, identifier bars 46, 48, 50, and 51, or identifying methods that are used to provide identification, inventory, pricing, and other such relevant information (i.e. Primary Information). Such standard and/or category information/ identification codes, identifier bars, or identifier methods are conventional and operate to provide primary information in a manner well known to those of ordinary skill in the art. Thus, while several specific types of standards, categories, identification codes, identifier bars, or identifier methods are described in this specification, any and all types of standards, categories, identification codes, identifier bars or methods may be used to implement the purposes of the present invention so long as it provides the appropriate relevant primary information.

1. System Hardware

Figure 5:
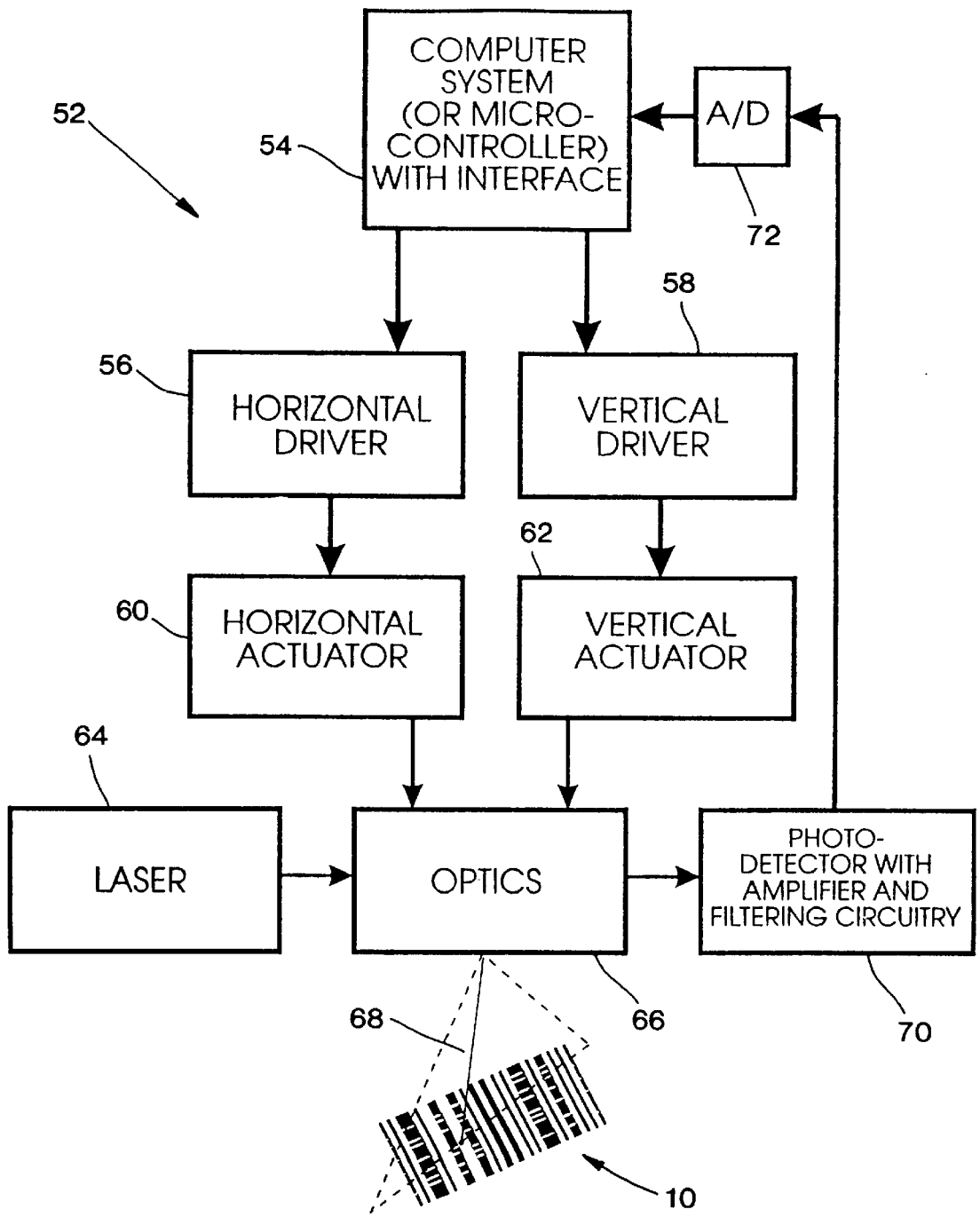
FIG. 5 is block diagram of a preferred embodiment of the bar code reading system hardware of the present invention which reads a bar code with primary and secondary information.

Reading a bar code 10 having encoded primary and secondary information may be achieved in many ways. One example of such a system 52 is shown in FIG. 5. The system 52 generally includes a computer system or microcontroller 54, horizontal and vertical drivers 56 and 58, horizontal and vertical actuators 60 and 62, a laser 64, optics 66, and a photodetector 70. The system 52 is controlled by the computer 54 which interfaces with the horizontal and vertical actuators 60 and 62 through horizontal and vertical drivers 56 and 58. A scan/reflected beam 68 is produced by the laser 64 and is directed towards the optics 66, which, in turn, is projected onto the bar code 10. Scanning and reading of the bar code 10 is achieved by optics 66 being mechanically controlled by horizontal and vertical actuators 60 and 62. These optics control the directional scan of the beam 68 onto the bar code 10. The photodetector 70 follows the same movement as the beam 68 by means of the mechanically controlled optics 66 to receive the beam reflected from the surface being scanned. (Generally, white has maximum reflectivity and black has minimum reflectivity.) The photodetector allows the system to detect and measure the presence of a primary bar 11 or other mark 44 on the surface.

Mark 13 or 21 can be any type of mark/material or lack of mark/material thereof and is not limited to any type of mark/material or lack of mark/material described in this specification. The photodetector 70 generally produces an analog voltage output in relation to the presence and measured amount of reflected light intensity. This analog voltage is converted to a digital signal through analog to digital converter 72 which is fed back to computer system 54 for interpretation. Each component of the system 52 is conventional and the computer system 54, horizontal and vertical drivers 56 and 58, horizontal and vertical actuators 60 and 62, laser 64, optics 66, photodetector 70, and analog to digital converter 72 operate together to provide horizontal and vertical scan control of a bar code reader. Thus, while these several specific components are described in this specification, any and all types of components can be used so long as a bar code reader that is able to control scanning in the horizontal and vertical directions or in non-orthogonal directions adaptable to carry out the present invention is provided.

Figure 6A:
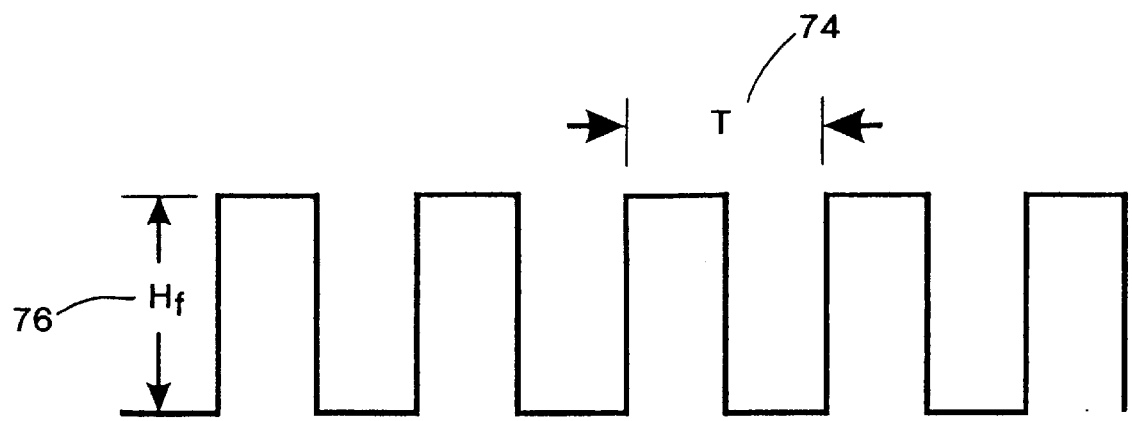
FIG. 6A is a square wave form scan pattern for reading a bar code with primary and secondary information in a preferred embodiment of the present invention.
Figure 6B:
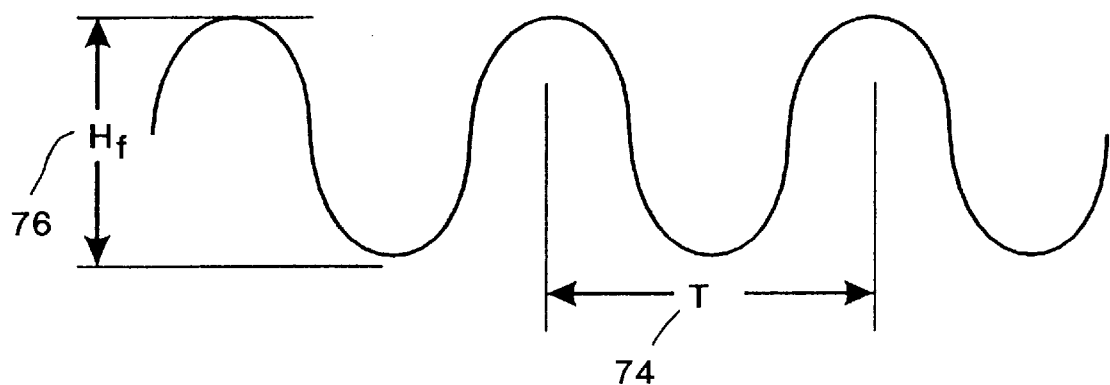
FIG. 6B is a sinusoidal wave form scan pattern for reading a bar code with primary and secondary information in a preferred embodiment of the present invention.
Figure 6C:
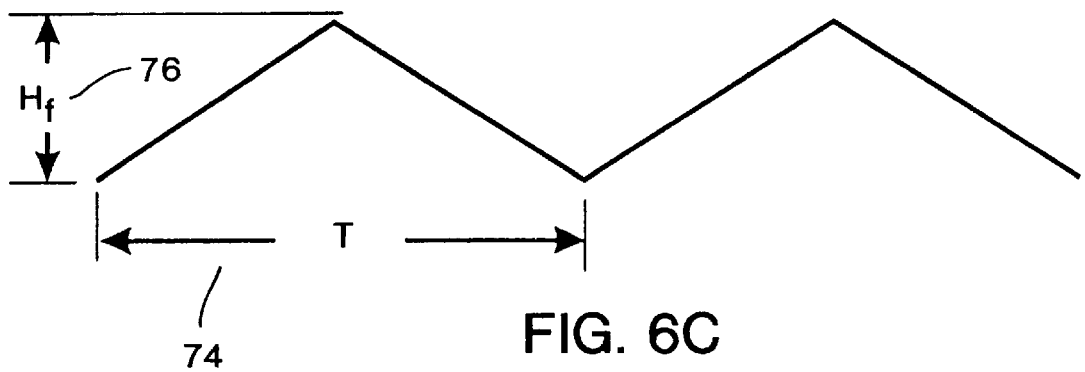
FIG. 6C is a triangular wave form scan pattern for reading a bar code with primary and secondary information in a preferred embodiment of the present invention.

2. Filtering Out Secondary Information to Avoid Interference with Reading Primary Information As stated earlier, the problem with scanning bar code 10 which contains encoded primary and secondary information is that the scanning of the voids, pits, spaces, or marks 13 or 21 which contain the secondary information placed within individual bars 11 of the bar code 10 may interfere with the scanning and reading of the primary information encoded in the spacing and size of the bars 11 as a whole. To overcome the reading/scanning interference problem, the primary information needs to be scanned or read in a manner such that the voids, pits, spaces, or marks 13 or 21 etc. are filtered out. Thus, while specific methods of filtering the voids, pits, spaces, etc. are described in this specification, any and all types of filtering methods may be used so long as the voids, pits, spaces, or marks 13 or 21 etc. are filtered and the primary and secondary information are able to be accurately read. It may not be necessary to filter out the voids, pits, spaces, or marks 13 or 21 etc. if they are designed so as not to interfere with the conventional reading methods. For example, a different color than black (i.e. blue) could be used and still not interfere with conventional reading technology. In the case where the secondary information does interfere with reading the primary information the interference problem may be solved by using a non-linear scan pattern as shown in FIG. 6A, 6B, or 6C (FIG. 6A shows a square wave scan pattern, FIG. 6B shows a sinusoidal wave scan pattern, and FIG. 6C shows a triangular wave pattern). While specific types of scan patterns or methods are described in this specification, any and all types of scan patterns and methods may be used so long as the scan pattern or method is suitable for filtering out the voids, pits, spaces, or marks 13 or 21 etc. and allows accurate reading of the primary and secondary information. The non-linear pattern must have a height and width dependent upon the dimensions of each primary bar 11. Scanning in this way provides a means of accurately measuring the thickness of each bar by detecting the location of the vertical edges of the vertical bars 11 and determining whether the surface being scanned is a void, pit, space, or mark 13 or 21 etc. (i.e. secondary data) embedded within the primary bar 11 or a space between primary bars 11.

Voids or pits 13 or 21 are filtered out for reading primary information within the bar code 10 by specifying minimum and maximum dimensions of a specific non-linear scanning function. These minima and maxima are determined by the extreme dimensions of both the primary and secondary encoded data. For example, as seen in FIG. 6E, the minimum width of a scan cycle T 74 as shown in FIGS. 6A, 6B, 6C, 6D, and 6E would be a fraction (i.e. 1/10th) of the smallest primary bar width Wpd 90 (dark space) and the smallest primary space width Wpw 91 (white space) to minimize errors associated with misinterpretation of the thickness of a primary bar Wpd 90. In addition, the height Hf 76 of the non-linear scan function needs to be greater than the maximum vertical dimension Wsw 92 of a void or pit 13 or 21 (secondary data) plus an error margin, but less than the height of the primary bars Hp 93. (FIG. 6E).

Figure 6D:
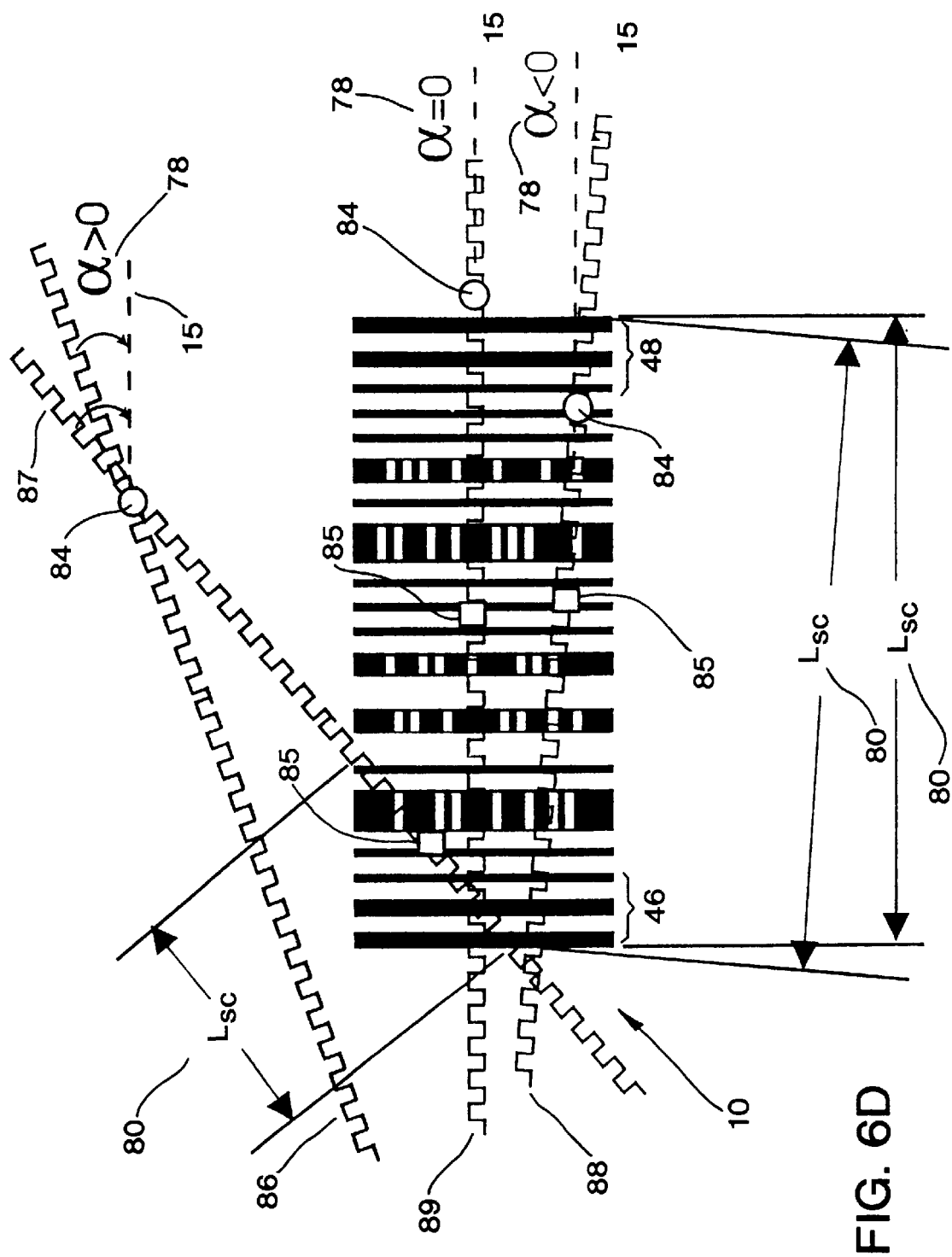
FIG. 6D is a schematic view of a preferred embodiment of the present invention showing square wave form scan paths being rotated about variable axes of rotation until the scan path crosses the entire bar code with primary and secondary information in a minimum crossing in order to locate the perpendicular direction to the primary bars.
Figure 6E:
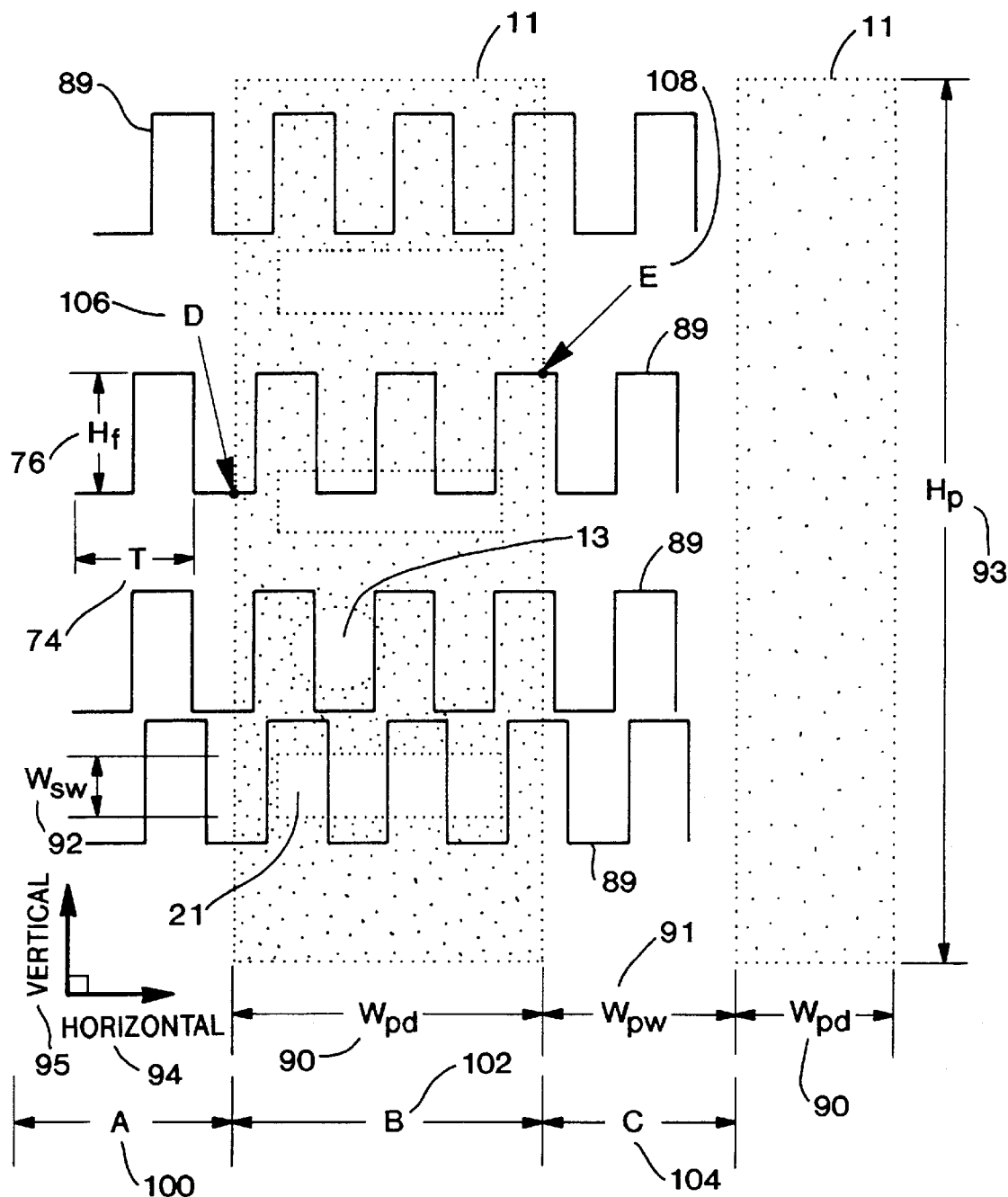
FIG. 6E is a schematic view of a specific example of square wave scan patterns of a preferred embodiment of the present invention which reads through a primary bar having secondary information encoded therein.

As seen in FIG. 6D the bar code reading system 52 (FIG. 5) scans the bar code 10 at different approaches or angles since the scan/reflected beam paths 86, 87, 88, and 89 are positioned at a scan angle α 78 relative to a horizontal axis 15 of the bar code 10. The scan beam 68 (FIG. 5) can generally be in one of four paths (FIG. 6D) relative to the bar code 10. In one scan path 86 the scan beam 68 is entirely off the bar code 10 (i.e. scan beam totally misses the entire bar code 10 and scan angle α 78 is greater than zero). In another scan path 87 the scan beam 68 is partially on (i.e. off the edge or not completely across and scan angle α 78 is greater than zero) the bar code 10. In a third scan path 88 the scan beam 68 is entirely across the bar code 10, but it is not positioned perpendicular to the primary bars 11 of the bar code 10 (i.e. completely across but not perpendicular and scan angle α 78 is less than zero). In a fourth and preferred scan path 89 the scan beam 68 is entirely across the bar code 10 and is perpendicular to the primary bars 11 and parallel to the horizontal axis 15 of the bar code 10 (i.e. scan angle α 78 equal to zero).

3. Finding The Direction Perpendicular To The Bar Code

In the present invention the method of reading/scanning a bar code 10 with primary and secondary information requires that the scan beam 68 entirely cross the entire crossing length Lsc 80 of bar code 10. The positioning of the scan beam 68 to a path perpendicular to vertical primary bars 11 to scan entirely across the crossing length Lsc 80 is achieved by rotating the scan path 86 about a scan axis of rotation 84 continuously until at least one start or stop code 46 or 48 of bar code 10 is crossed, such as, is seen in FIG. 6D in which the scan path will be at a position similar to scan path 87. Next, the original axis of rotation 84 is shifted to a new axis of rotation 85, which is within the confines of the bar code 10 and at the center of the partial crossing length Lsc 80. The scan path continues to be rotated about the new axis of rotation 85 until both a start or stop code 46 and 48 of bar code 10 is crossed (i.e. similar in position to path 88 but where scan angle à is still greater than zero or in a position similar to scan path 88 where the angle à is less than zero). The scan path further continues to be rotated about the new axis of rotation 85 until a minimum total crossing length Lsc 80 is found at a position similar to scan path 89. The positioning of the scan path in this manner determines the direction perpendicular to the bar code 10, and may be used as a reference to find the direction parallel to the primary bars 11 which is orthogonal thereto so that the secondary information can be read/scanned. Thus, while specific methods of ensuring that the scan path be across the entire crossing length Lsc 80 and of finding the perpendicular and parallel directions relative to the bar code 10 are described herein, any and all types of methods for ensuring the scan path to totally cross the entire crossing length Lsc 80 and of finding the perpendicular and parallel directions relative to the bar code 10 may be used so long as all of the information within the bar code can be accurately read. Other such methods may include the use of a split beam to determine a simultaneous crossing angle which would thereby allow determination of the perpendicular to a bar code 10. Another method may include processing an image taken from a camera to determine the direction perpendicular to the primary bars 11.

4. Reading Secondary Information

Figure 6F:
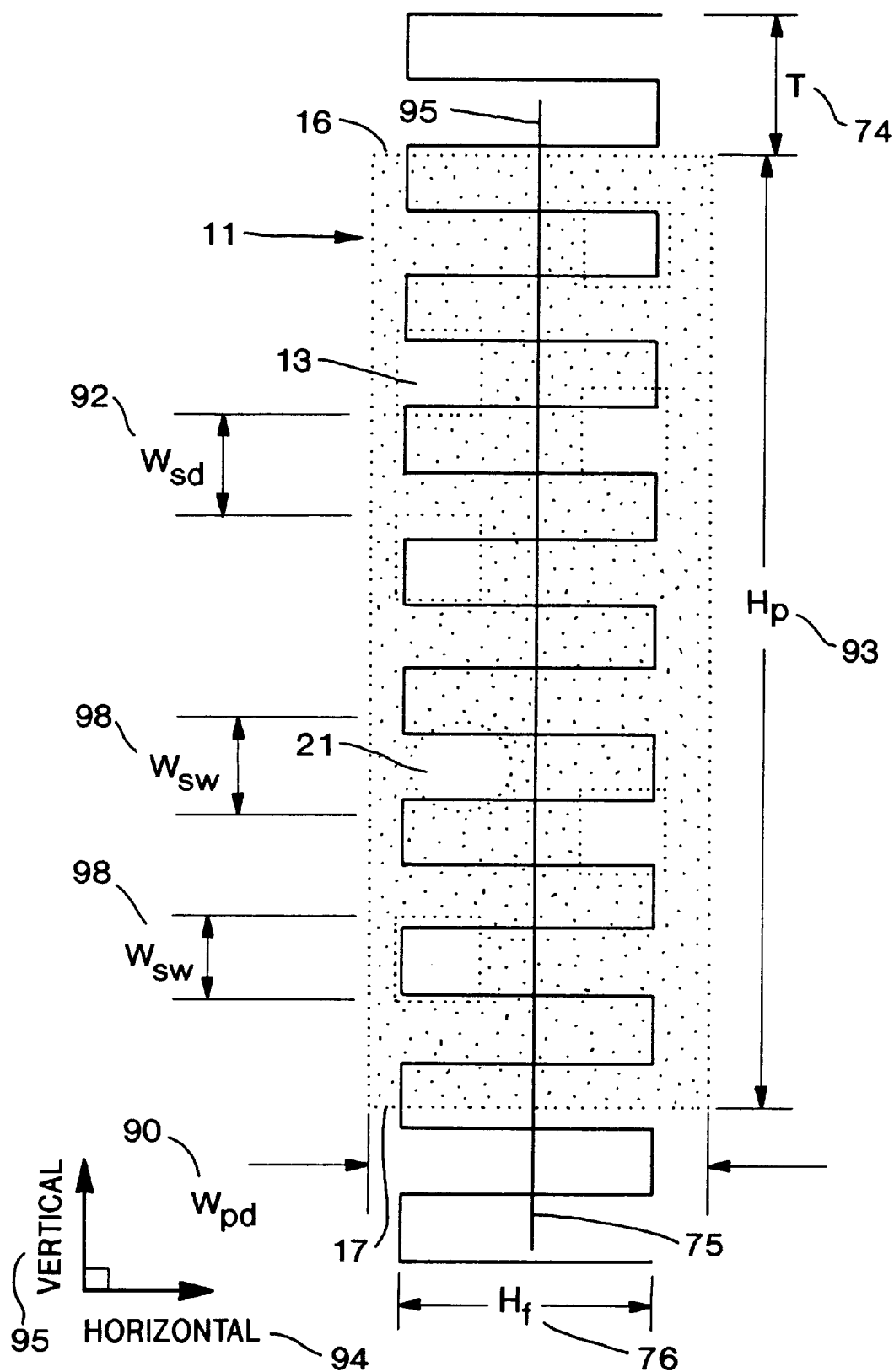
FIG. 6F is a schematic view of one example of a square wave scan pattern of a preferred embodiment of the present invention which reads the secondary information encoded in multiple tracks embedded in a primary bar.

For reading/scanning secondary information along the primary bars 11 of the bar code 10, the plane perpendicular to the primary bar code needs to be identified so that the plane parallel to the primary bars can be identified. Also, identifying and selecting those specific primary bars 10 having desired secondary information needs to be determined and performed, respectively. Furthermore, the period T 74 of the non-linear scan function must be less than the height of the primary bar Hp 93 as shown in FIG. 6F. Also, the height Hf 76 of the non-linear scan function must be centered 75 on primary bar 11 and approximately equal but slightly smaller than the width of the primary bar Wpd 90.

FIG. 6E shows a non-linear square-wave scan function that has a constant scan cycle period T 74 for minimizing reading errors. A random pattern with a maim period T 74 (i.e. not shown) wherein the values of the period T 74 fluctuate below the maximum value so that errors are minimized may also be used. The scan begins by the non-linear scanning function approaching the primary bar 11 as shown at region A 100 where at least one complete scan cycle is shown with high reflectivity (i.e. white space detected). The first instance in which the non-linear scanning function detects the low reflectivity (i.e. dark bar) is shown in region B 102 of FIG. 6E.

The non-linear scanning function will continue to pass through various cycle periods T 74 until a complete cycle of high reflectivity (i.e. white space) is completed as shown in region C 104. In region B 102, the non-linear scanning function is considered to be reading low reflectivity because a complete cycle where there is high reflectivity does not exist. Some portions of a cycle that have high reflectivity occur in region B 102 because a void, pit, space, or mark 13 or 21 may exist over only part of a scan cycle (as opposed to an entire scan cycle (i.e. an entire period T 74).) The width of the primary bar Wpd 90 is calculated by measuring the crossing time from the point of first detecting a low reflectivity occurrence at point D 106 (i.e. dark bar edge is crossed) to the point of first detecting a transition from low to high reflectivity occurrence (i.e. white space) at point E 108 followed by a complete scan cycle of high reflectivity (i.e. white space immediately follows point E 108 as shown in Region C 104). Another method of determining the width of the primary bar Wpd 90 is by providing at least some dark space on both the left and right sides of the secondary information. This dark space must have a width that is less than the smallest width Wpd 90 of all the primary bars 11 but that is still detectable by the bar code 10 reading system. This technique enables the scanning beam 68 to detect the left and right edges of a primary bar 11 while the scanning function is maintained linear as used in many conventional bar code (i.e. UPC) scanners.

In FIG. 6F, an example method of reading the secondary information is shown where a scan path is centered along the longitudinal axis 75 of the vertical primary bar 11 and is aligned parallel to the longitudinal axis 75 of the vertical primary bar 11. Multiple tracks of secondary data can be scanned and decoded in this manner which is similar to a raster-like scan by knowing the widths of secondary data spacing Wsd 92 (dark space between secondary marks), the widths of the secondary data marks Wsw 98 (white space of secondary marks), the vertical direction 95, the horizontal direction 94, and the period T 74 of the scan function. Thus, while specific methods exist for reading/scanning or decoding secondary information, any and all methods can be used so long as the reading method can accurately decode the secondary information.

In general, the method of scanning disclosed above approximates the average time to scan through the primary or secondary data. An alternative method (not shown) uses a spot (i.e. elliptical) that scans the entire primary and secondary encoded data to read and interpret the information. While specific methods of reading bar codes 10 with primary and secondary information have been described, any and all methods that would allow accurate reading of bar codes 10 may also be used to implement the present invention. The reading/scanning errors that may occur with the present invention may further be reduced by performing multiple or repeated scans of the bar code and taking the average of the multiple or repeated scans, using parity checking (i.e. even and odd parity checking), or using any and all other methods known in the art for reducing or minimizing read/scan errors of bar codes which may be adapted in conjunction with the present invention.

5. The Reading Algorithms

Figure 7A:
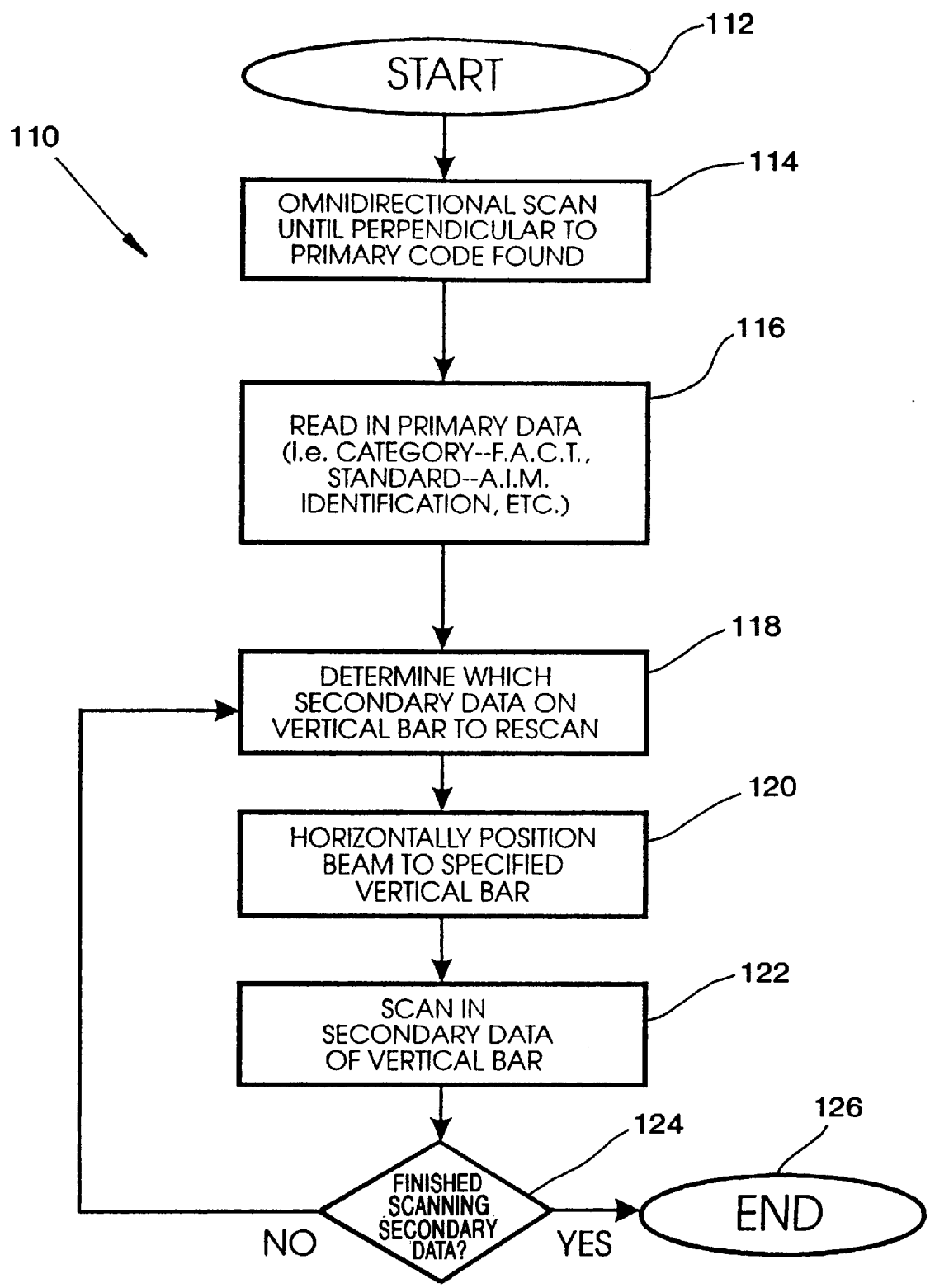
FIG. 7A is a flow chart of a preferred algorithm of the present invention for scanning a bar code having primary and secondary information encoded therein.

In FIG. 7A, a flow chart 110 of an exemplary algorithm for reading both the primary and secondary information encoded in the bar code 10 is shown. The algorithm begins at start block 112 by omnidirectionally scanning until the plane perpendicular to the primary bar code 11 is determined. Next, the standard (i.e. AIM, etc.) and category (i.e. FACT, etc.) identification and other primary information are determined by reading in 116 the primary data from the primary bar code 11. A counter or timer may be used to keep track of the number and position of the leading/trailing edges of all the primary bars 11. Any and all methods of finding the perpendicular to a bar code and of reading the primary information which are able to be adapted for use with the present invention are intended to be covered by the present invention.

At block 118, depending on the action to be performed, the system 52 performs the steps of determining and selecting the corresponding primary bar 11 having the desired secondary data which needs to be decoded for the system to perform a specific task. The scan beam 68 is horizontally positioned at the center of the selected vertical primary bar 11 at block 120. The selected vertical bar 11 is then vertically scanned 122 with scan beam 68 to scan in the secondary data. At decision block 124, the system determines whether more secondary data needs to be scanned in order to accomplish the desired task. If more secondary data needs to be read, program flow loops back to repeat steps 118–124. The loop continues until all desired secondary data is scanned. When all of the desired secondary data is read, the algorithm ends at block 126. Thus, while specific steps of the algorithm for reading both the primary and secondary information on the bar code 10 may described, any and all algorithm steps for reading both primary and secondary information on the bar code 10 can be used so long as the steps allow the algorithm to accurately read all of the information on the bar code 10.

Figure 7B:
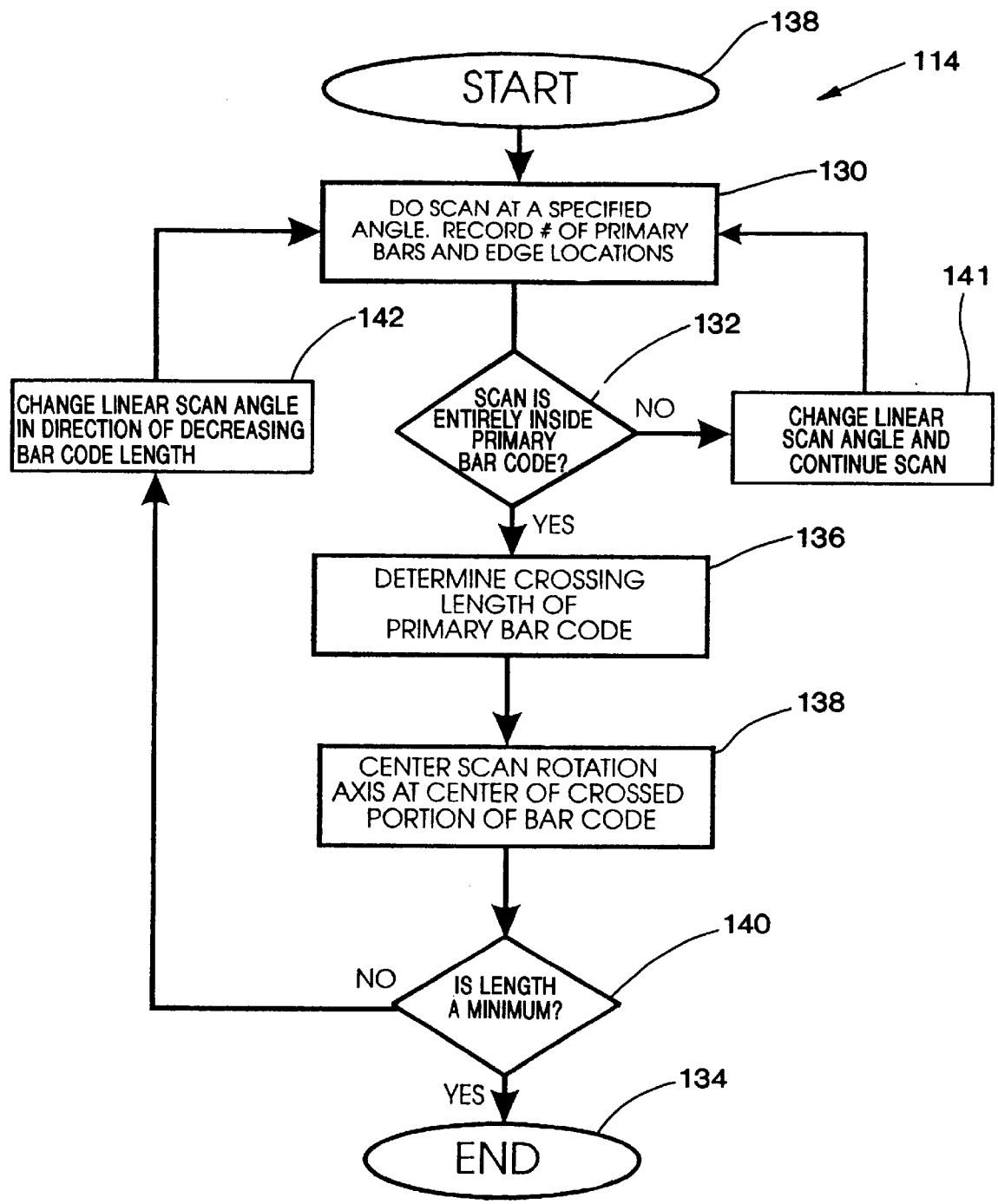
FIG. 7B is a flow chart of the process of the present invention showing a specific algorithm for locating the direction perpendicular to the primary bar code.

FIG. 7B shows a more detailed algorithm 114 describing how the omnidirectional scan of FIG. 7A determines the horizontal direction perpendicular to the vertical primary bars 11. The subroutine begins at 138 by scanning in a direction that is at a specified angle to the primary bar 11. At decision 132, it is determined whether the scan beam 68 is inside the bar code 10, that is, whether the scan crosses the entire primary bar code 10 (i.e. passes through both the start and stop codes 46 and 48) or only a part or none of the bar code 10.

If none of bar code 10 has been scanned (FIG. 7B, block 132), the program returns to block 130 and the scan path 86 is again rotated about scan axis of rotation 84 (FIG. 6D) until at least a portion of the scan path (i.e. scan path 87 in FIG. 6D) of bar code 10 is intersected and the slice length Lsc 80 is recorded (FIG. 6D) along with the number of primary bars and edge locations (FIG. 7B).

If all of the primary bars 11 have not been crossed by scan path 87 (FIG. 7B, block 132), the program moves to block 141 where the axis of rotation is changed to a position 85 approximating the center of measured distance Lsc 80 and the scan angle is rotated thereabout a small angle and scanning is continued until both a start 46 and stop 48 code is detected at which point the system knows that the scan is entirely wihin bar code 10 (FIG. 7B, 132).

When the scan beam 68 and beam path 88 have crossed the entire primary bar code 10, the program moves to block 136 and again measures, the crossing length Lsc 80 (See FIG. 6D) of the scan beam 68 and then centers at block 138 the scan rotation axis 85 at the center of bar code 10.

At decision 140, if the recorded length Lsc 80 is less than all prior lengths (within entire bar code 10) then the length is considered a minimum and the perpendicular to the primary bar code is established and the subroutine finishes at end 134. At decision block 140 if the length Lsc not a minimum, then the scan angle is changed by a small amount in the direction of decreasing crossing slice length Lsc 80 (block 142, FIG. 7B) and the scan is then repeated at block 130 until a minimum length Lsc is found thereby identifying the plane perpendicular to the primary bar.

Thus, while specific steps of the subroutine for finding a perpendicular direction and, in turn, a parallel direction are described, any and all subroutine/algorithm steps for finding a perpendicular direction or parallel direction may be used so long as they scan to accurately read all of the information on the bar code 10. For example, an image obtained from a CCD camera which is processed by an appropriate algorithm or a simultaneous crossing of a split beam may be used to find the perpendicular to a bar code 10.

Figure 7C:
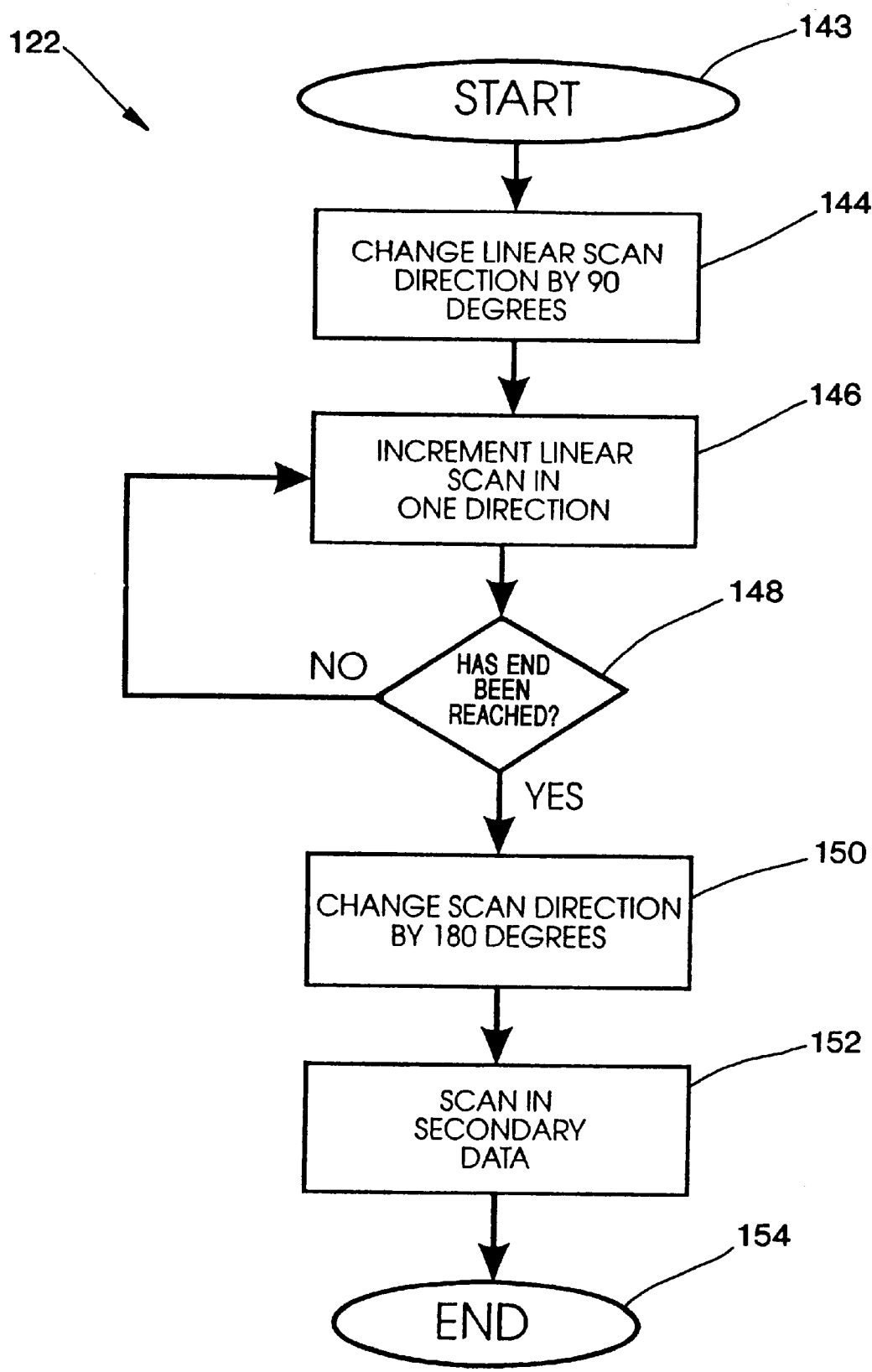
FIG. 7C is a flow chart of the process of the present invention showing a specific algorithm for reading the secondary information embedded in the primary bar.

FIG. 7C shows a still more detailed algorithm of block 122 of FIG. 7A relating to scanning in secondary data. The subroutine begins at start 143 where the scan direction is then changed at block 144 by 90 degrees from the perpendicular of the primary bar code (i.e. is changed to a direction parallel to the primary bars). The beam 68 is then moved by a scan function in the direction towards one end 16 (FIG. 6F) of a primary bar 11 at block 146. At decision 148, this end 16 of the primary bar 11 is determined if a complete cycle of the non-linear scan function has high reflectivity (i.e. white space). If this end 16 is not found, the non-linear scan continues towards that end 16 of the primary bar 11. Once the end 16 of the primary bar 11 is reached, the scan direction is changed by 180 degrees at block 150. The secondary data is then read in at block 152 by scanning beam 68 to an opposite end 17 of the primary bar and the subroutine is finished at end 154. Thus, while specific steps of the subroutine for scanning in secondary data are described, any and all subroutine/algorithm steps for scanning in secondary data may be used so long as the secondary information of the bar code 10 is accurately read.

6. Manufacturing Process Control

Figure 8:
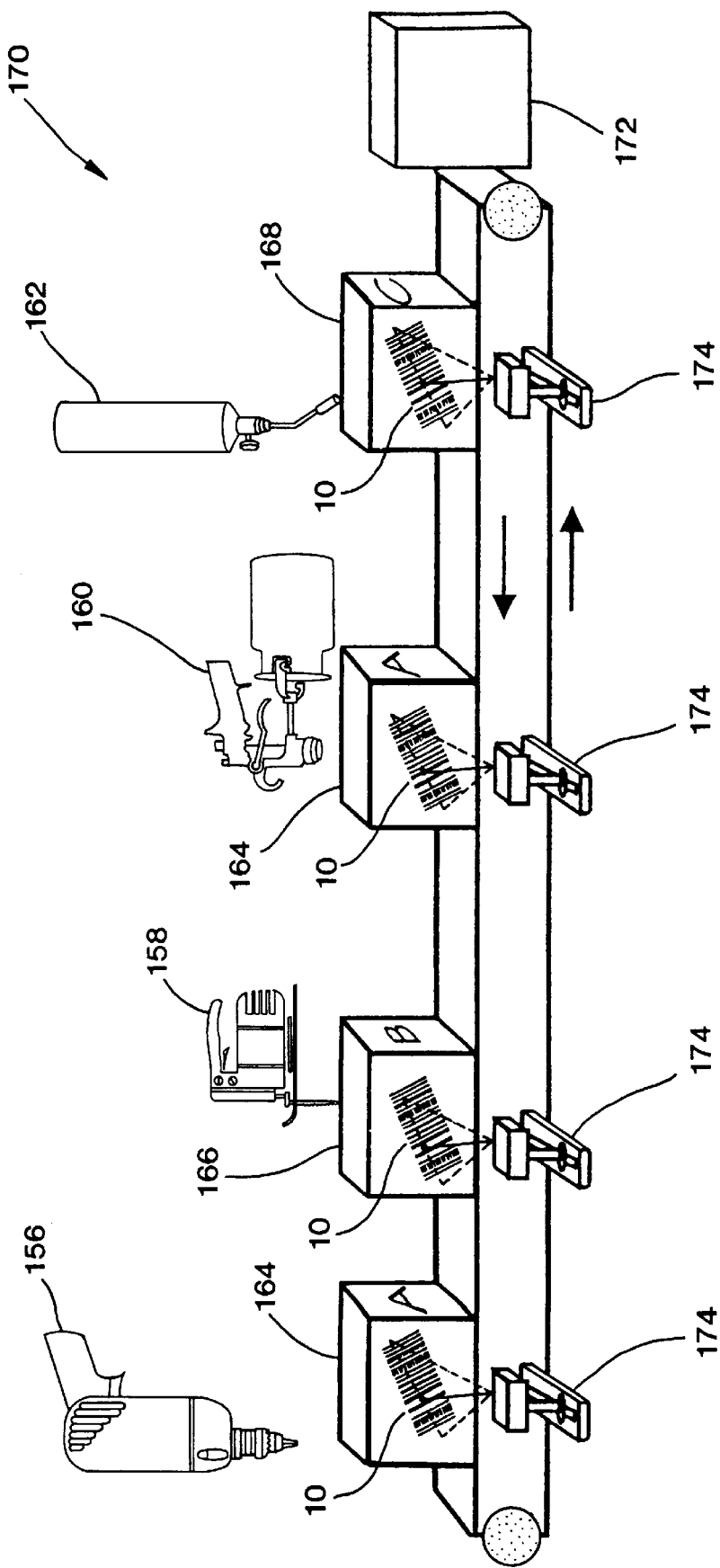
FIG. 8 shows a bar code of the present invention having primary and secondary information used to control a manufacturing process whereby the secondary information embedded in the primary bars of the bar code are selectively read and decoded and then cause a computer to direct implementation of a selected station process on a selected product located at that station.

As seen in FIG. 8, the bar code 10 of the present invention having both primary and secondary data encoded therein is used to control a manufacturing process for building a specified product 164,166,168. For example, a bar code 10 having primary and secondary information encoded therein is applied to a side wall of a non-finished product 164, 166, or 168 and is printed by a laser printer 172 or other bar code 10 manufacturing device. The laser printer 172 produces secondary information such as date of manufacture, place of manufacture, and/or type of material used, etc. Shown in FIG. 8 are flexibly mounted or positioned reading devices 174 placed at different stations of a manufacturing process that read bar code 10. Station readers 174 read bar codes 10 and pass the read information to a computer (not shown) which decodes the information and then commands the machine controlling each station whether or not to effect the station process operation on the unfinished product then located at that station. For example, shown is a machine for drilling holes at station 156, cutting at station 158, painting at station 160, and welding at station 162. In FIG. 8, for example, three different products are shown as product A 164, B 166, and C 168. Product A 164 requires a hole and paint, product B 166 requires a cut, and product C 168 requires a weld. These process requirements are encoded in the secondary information in each product's respective bar code 10. As each product moves through the assembly line process from station-to-station, reader 174 reads the bar code 10 with primary and secondary information, decodes all of the primary information and all or parts of the selected secondary information, such as, a product category is determined from the primary data (i.e. product A, B, C, etc.) and, the necessary or desired process step to be implemented for each product is determined from the secondary data, (i.e. product A is directed to machines 156 and 160, product B is directed to machine 158 only, and product C is directed to machine 162 only). With this knowledge, the computer system commands the appropriate manufacturing process step to be correspondingly performed on each product at the appropriate station. Thus, while a specific machine tool application for the bar code 10 with primary and secondary information is described, the present invention may be used in any and all applications where a bar code 10 with primary and secondary information can be utilized.

The method of reading the bar code described above can also be applied to bar code 10 with the secondary information embedded within the spaces between the primary bars 11 of the bar code 10, and the method described above could be adapted to read/scan the secondary information in the spaces rather than in the primary bars 11 as would be obvious to a person of ordinary skill in the art who is given my aforesaid invention disclosure.

D. Scope of Disclosure

The preferred embodiment of the invention is described above in the Figures and Detailed Description. Unless specifically noted, it is the intention of the inventors that the words and phrases in the specification and claims be given the ordinary and accustomed meanings to those of ordinary skill in the applicable art(s). If the inventors intend any other meaning, they will specifically state that they are applying a special meaning to a word or phrase.

Likewise, the use of the words "function" or "means" in the Detailed Description is not intended to indicate a desire to invoke the special provisions of 35 U.S.C. Section 112, Paragraph 6 to define his invention. To the contrary, if the provisions of 35 U.S.C. Section 112, Paragraph 6 are sought to be invoked to define the invention, the claims will specifically state the phrases "means for" or "step for" and a function, without also reciting in such phrases any structure, material, or act in support of the function. Even when the claims recite a "means for" or "step for" performing a function, if they also recite any structure, material, or acts in support of that means or step, then the intention is not to invoke the provisions of 35 U.S.C. Section 112, Paragraph 6. Moreover, even if the inventors invoke the provisions of 35 U.S.C. Section 112, Paragraph 6 to define the invention, it is the intention that the invention not be limited only to the specific structure, material, or acts that are described in his preferred embodiment. Rather, if the claims specifically invoke the provisions of 35 U.S.C. Section 112, Paragraph 6, it is nonetheless the intention to cover and include any and all structures, materials, or acts that perform the claimed function, along with any and all known or later developed equivalent structures, materials, or acts for performing the claimed function.

For example, the present invention specifically makes reference to generally rectangular bar codes, generally circular bar codes and two-dimensional (2-D) bar codes, in which each of these types of bar codes can store primary and secondary information. However, numerous other types of bar codes that can store or be adapted to store primary and secondary information are well known to exist, and most likely, numerous other bar codes that can store or be adapted to store primary and secondary information will be developed in the future. The inventions described herein are not to be limited in use with the specifically referenced types of bar codes, but rather, are intended to be used with any and all types of bar codes.

As another example, the present invention makes reference to standard components that are used to make a bar code reading system for bar codes having primary and secondary information. The disclosure specifically references several examples of such components, including a computer system, horizontal and vertical drivers, horizontal and vertical actuators, laser optics, photodetector, etc. However, numerous other bar code reading components or sub-systems are well known to exist, and most likely, numerous bar code reading components or sub-systems will be developed in the future. The inventions described herein are not to be limited to the specific components or sub-systems disclosed in the preferred embodiment, but rather, are intended to be used with any and all applicable bar code reading systems. Likewise, the preferred embodiment depicted in the drawings shows a bar code reading system with various components. Numerous other configurations, and multiple bar code reading/scanning devices, can be substituted for the single device.

Further, the specification in some places refers to several scan patterns that perform filtering functions. The specific form of the scan pattern is not important to the invention. In its preferred form, applicant divides the algorithm of reading a bar code with primary and secondary information into several steps. However, with appropriate programming well known to those of ordinary skill in the art, some of the steps can be implemented into a single step. Thus, it is not the intention to limit the invention to any particular form or any number of method steps or to any specific procedural arrangement.

Likewise, although the preferred application of the bar code reading system is for bar codes with primary and secondary information applied on objects, products, etc. and for reading the primary information, selectively determining primary bars with secondary information that are to be read and performed on the object, reading the selectively determined primary bars for the secondary information, and performing commands programmed in the secondary information on the object, product, etc., it is obvious that many other applications exist. Thus, the invention is not to be limited to a bar code reading system and bar codes with primary and secondary information as used only for objects, products, etc.

Further examples exist throughout the disclosure, and it is not the intention to exclude from the scope of the invention the use of structures, materials, or acts that are not expressly identified in the specification, but nonetheless are capable of performing a recited function.

What is claimed is:

1. A method of reading a single bar code, wherein said single bar code is comprised of a plurality of elements, each element having a variable width defining a first direction, the width encoding primary information, and each element having a length defining a linear or curvilinear second direction, at least one of said elements having secondary information encoded within said length, comprising the acts of:

scanning the single bar code area in a first direction to decode the primary information encoded in the widths of the bars, and scanning the single bar code in a second direction to decode the secondary information, wherein said second direction is neither the same as nor parallel to said first direction.

2. The method of claim 1 wherein the single bar code comprises a plurality of spaced apart primary bars or rings and said first direction comprises scanning across the bars or the rings, and said second direction comprises scanning parallel to the primary bars or around the rings.

3. The method of claim 2 wherein said first direction further comprises scanning across parallel bars or concentric rings, and said second direction comprises scanning parallel to the parallel bars or around the concentric rings.

4. The method of claim 1 wherein the single bar code comprises a plurality of spaced apart primary bars, and the act of scanning the primary bars in said first direction further comprises the acts of:

locating a direction perpendicular to the primary bars, scanning the primary bars in the perpendicular direction, and interpreting the decoded primary information obtained.

5. The method of claim 4 wherein the act of locating a direction perpendicular to the primary bars further comprises the act of:

scanning the primary bars with a scan beam in a scan path in a plane of the single bar code which path is rotated about one or more axes sequentially as necessary until the path crosses the entire bar code in a minimum crossing distance.

6. The method of claim 4 wherein the act of locating a direction perpendicular to the primary bars further comprises the acts of:

scanning the primary bars with a scan beam in a scan path in a plane of the bars while the path is rotated about one axis until the path crosses a start code or stop code of the bar code thereby identifying a crossing length of the bar code, shifting the axis of rotation to a point within the bar code substantially at the center of the crossing length of the bar code, and continuing to rotate the scan path until both a start code and stop code of the bar code are crossed in a minimum crossing length.

7. The method of claim 4 wherein the act of locating a direction perpendicular to the primary bars further comprises the acts of:

scanning the primary bars with a scan beam in a scan path at an angle to a transverse axis common to all of the bars, positioning the scan beam path across an entire crossing length of the bar code, and minimizing the entire crossing length of the scan beam path across the bar code.

8. The method of claim 7 wherein the act of positioning the scan beam path across an entire crossing length of the bar code further comprises the acts of:

rotating the scan beam path about a first axis until at least a portion of the bar code is crossed by the path, measuring the length of the path portion crossing the bar code, substantially re-positioning the axis of rotation of the path at the center of the path portion crossing the bar code, and rotating the scan beam path about the re-positioned axis until the scan beam path crosses the entire bar code.

9. The method of claim 8 wherein the act of positioning the scan beam path across an entire crossing length of the bar code further comprises the of:

sequentially rotating the scan beam path about a plurality of axes as necessary until the scan path is inside of the entire bar code in a minimum crossing distance.

10. The method of claim 7 wherein the act of positioning the scan beam further comprises the act of:

changing the angle at which the primary bars are scanned in a direction wherein the crossing length decreases.

11. The method of claim 7 wherein the act of minimizing the entire crossing length further comprises the acts of:

substantially centering a scan rotation axis of the scan path at a center of a last measured crossing length of the bar code, changing the angle at which the primary bars are scanned in a direction of decreasing crossing length, and repeating the centering and changing steps until the crossing length is a minimum length across the entire bar code.

12. The method of claim 4 wherein the act of locating a direction perpendicular to the primary bars further comprises the act of:

using an image processing system to find the perpendicular direction.

13. The method of claim 4 wherein the act of locating a direction perpendicular to the primary bars further comprises the act of:

using multiple beams that find the perpendicular direction when the multiple beams simultaneously cross a primary bar.

14. A method of reading a single bar code having a plurality of spaced apart bars, the bar code having primary and secondary information encoded in the single bar code, comprising the acts of:

scanning the single bar code area in a first direction to decode the primary information;

determining a direction perpendicular to the bars, identifying each bar with secondary information encoded therein; and scanning selected ones of the bars in a second direction orthogonal to the first direction to decode the secondary information.

15. The method of claim 14 wherein the determining, identifying and orthogonal scanning acts are continuously repeated until all of the selected secondary information is decoded.

16. The method of claim 14, wherein the secondary information is encoded in a plurality of tracks contained in at least one of said bars in the single bar code, said tracks positioned at an angle to said first direction, further comprising the acts of:

identifying each track of secondary information, selecting an identified track to be scanned, and scanning the selected track to decode the secondary information.

17. The method of claim 16 wherein the act of scanning the selected track further comprises the acts of:

first positioning the scan beam at the selected track.

18. The method of claim 17 wherein the acts of identifying, selecting, positioning and scanning are continuously repeated until all of the selected secondary information is decoded.

19. The method of claim 1 wherein the single bar code comprises a plurality of spaced apart bars, including first and second bars, and the act of scanning the bars in said second direction further comprises the acts of:

positioning a scan beam path parallel to the spaced apart bars, moving the scan beam to one end of the single bar code, rotating the scan beam less than a full rotation to be parallel to the spaced apart bars, scanning the area of encoded secondary information along the entire length of a first bar, interpreting the secondary information obtained from the first bar, scanning the area of encoded secondary information along an entire length of a second bar adjacent to the first bar, and interpreting the secondary information obtained from the scan of the second bar.

20. The method of claim 1 wherein the step of scanning the area in one direction further comprises the step of:

filtering secondary information which interferes with scanning the primary information.

21. The method of claim 20 wherein the step of filtering her comprises the step of:

scanning the area with a non-linear scan beam to obtain the primary information.

22. The method of claim 21 wherein the step of scanning the area with a non-linear scan beam further comprises the step of:

scanning the area with a square wave scan beam to obtain the primary information.

23. The method of claim 21 wherein the step of scanning the area with a non-linear scan beam further comprises the step of:

scanning the area with a sinusoidal wave scan beam to obtain the primary information.

24. The method of claim 21 wherein the step of scanning the area with a non-linear scan beam further comprises the step of:

scanning the area with a triangular wave scan beam to obtain the primary information.

25. The method of claim 21 wherein the step of scanning the area with a non-linear scan beam further comprises the step of:

scanning the area with a random pattern scan beam to obtain the primary information.

26. The method of claim 21 wherein the area is a plurality of spaced apart bars and wherein the step of scanning the area with a non-linear scan beam further comprises the step of:

providing a non-linear scan beam that has
a minimum scan cycle width that is a fraction of a smallest width of each of the primary bars and a smallest width of each of a number of spaces between the primary bars, and
a height that is at least greater than a maximum dimension of spaces used for defining the secondary information and less than a height of the primary bars.

27. The method of claim 20 wherein the area is a plurality of spaced apart bars and wherein the step of filtering further comprises the step of:

detecting a proper width of a bar by providing a detectable dark region border on each side of the encoded secondary information in the space where said information is encoded such that each border is generally perpendicular to the one direction for scanning the bars for obtaining the primary information and wherein each border has a width less than the smallest width of all of the primary bars.

28. The method of claim 1 wherein the step of scanning the area in the other direction to obtain the secondary information comprises the step of:

scanning the area with a non-linear scan beam to obtain the secondary information.

29. The method of claim 28 wherein the step of scanning the area with a non-linear scan beam further comprises the step of:

scanning the area with a square wave scan beam to obtain the secondary information.

30. The method of claim 28 wherein the step of scanning the area with a non-linear scan beam further comprises the step of:

scanning the area with a sinusoidal wave scan beam to obtain the secondary information.

31. The method of claim 28 wherein the step of scanning the area with a non-linear scan beam further comprises the step of:

scanning the area with a triangular wave scan beam to obtain the secondary information.

32. The method of claim 28 wherein the step of scanning the area with a non-linear scan beam further comprises the step of:

scanning the area with a random pattern scan beam to obtain the secondary information.

33. The method of claim 28 wherein the area is a plurality of spaced apart bars and the step of scanning the area with a non-linear scan beam further comprises the step of:

providing a non-linear scan beam having
- a scan cycle width that is less than the height of the bar, and
- a maximum height that is centered on the bar and that is approximately equal and slightly smaller than the width of the bar being scanned.

\* \* \* \* \*